United States Patent
Korcharz et al.

(10) Patent No.: US 7,170,194 B2
(45) Date of Patent: Jan. 30, 2007

(54) CONFIGURABLE MULTIPLE POWER SOURCE SYSTEM

(75) Inventors: Dror Korcharz, Bat Yam (IL); Yair Darshan, Petach Tikva (IL); Ilan Atias, Haifa (IL); David Pincu, Holon (IL)

(73) Assignee: PowerDsine, Ltd., Hod Hasharon (IL)

( * ) Notice: Subject to any disclaimer, the term of this patent is extended or adjusted under 35 U.S.C. 154(b) by 529 days.

(21) Appl. No.: 10/763,232

(22) Filed: Jan. 26, 2004

(65) Prior Publication Data
US 2004/0201931 A1  Oct. 14, 2004

Related U.S. Application Data

(63) Continuation-in-part of application No. 10/750,908, filed on Jan. 5, 2004.

(60) Provisional application No. 60/418,599, filed on Oct. 15, 2002.

(51) Int. Cl.
*H02J 1/10* (2006.01)
*H02J 7/34* (2006.01)

(52) U.S. Cl. ............... 307/21; 307/25; 307/44; 307/45; 307/46; 307/74

(58) Field of Classification Search ............ 307/21, 307/25, 44, 45, 46, 74
See application file for complete search history.

(56) References Cited

U.S. PATENT DOCUMENTS

| | | | |
|---|---|---|---|
| 5,157,269 A | 10/1992 | Jordan | 307/59 |
| 5,266,838 A | 11/1993 | Gerner | 307/13 |
| 5,481,730 A * | 1/1996 | Brown et al. | 713/340 |
| 5,712,779 A | 1/1998 | Sheppard et al. | 363/69 |
| 5,745,670 A | 4/1998 | Linde | 714/22 |
| 5,834,925 A | 11/1998 | Chesavage | 323/272 |
| 5,844,329 A | 12/1998 | Bailey | 307/66 |
| 5,892,299 A | 4/1999 | Siewert et al. | 307/85 |
| 5,914,585 A | 6/1999 | Grabon | 320/125 |
| 6,008,971 A | 12/1999 | Duba et al. | 361/64 |
| 6,009,000 A | 12/1999 | Siri | 363/21.09 |
| 6,104,103 A | 8/2000 | Siewert et al. | 307/64 |
| 6,121,693 A | 9/2000 | Rock | 307/18 |
| 6,125,448 A | 9/2000 | Schwan et al. | 713/300 |
| 6,153,946 A | 11/2000 | Koch et al. | 307/64 |
| 6,184,667 B1 * | 2/2001 | Lacey | 323/282 |
| 6,377,874 B1 | 4/2002 | Ykema | 700/286 |
| 6,420,850 B1 | 7/2002 | Thurman | 320/130 |
| 6,438,007 B1 | 8/2002 | Wildrick et al. | 363/65 |
| 6,473,608 B1 | 10/2002 | Lehr et al. | 455/402 |
| 6,539,484 B1 | 3/2003 | Cruz | 713/300 |
| 6,628,011 B2 | 9/2003 | Droppo et al. | 307/43 |
| 7,112,896 B2 * | 9/2006 | Kinnard | 307/43 |
| 2001/0024109 A1 | 9/2001 | Sobkow et al. | 323/225 |

(Continued)

*Primary Examiner*—Brian Sircus
*Assistant Examiner*—Hal I. Kaplan
(74) *Attorney, Agent, or Firm*—Simon Kahn

(57) ABSTRACT

A system for supplying additional power to a module having an internal power supply, the system comprising: a module having an associated power supply, the power supply not being designed to accommodate power sharing; at least one load associated with the module, the load receiving power from the power supply; a variable current limited power source connected to the module supplying additional power to the at least one load; and a controller; whereby the variable current limited power supply is responsive to an output of the controller to vary the current limit of the variable current limited power supply.

49 Claims, 15 Drawing Sheets

U.S. PATENT DOCUMENTS

| | | | |
|---|---|---|---|
| 2002/0091950 A1 | 7/2002 | Cruz | 713/300 |
| 2003/0141907 A1 | 7/2003 | Canova et al. | 327/131 |
| 2003/0168913 A1 | 9/2003 | Kinnard | 307/29 |
| 2004/0051397 A1 | 3/2004 | Juntunen et al. | 307/130 |

* cited by examiner

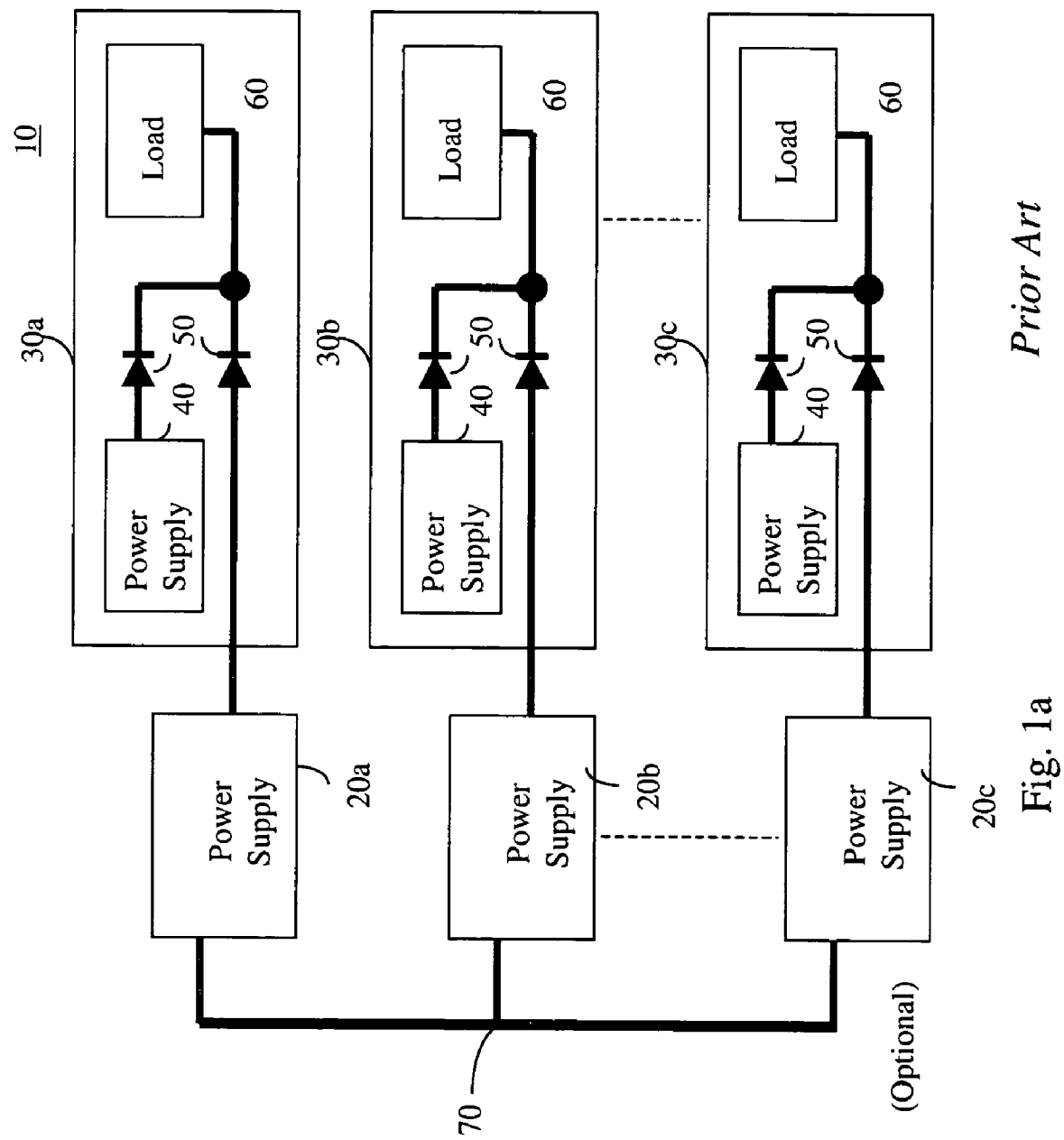
Fig. 1a  *Prior Art*

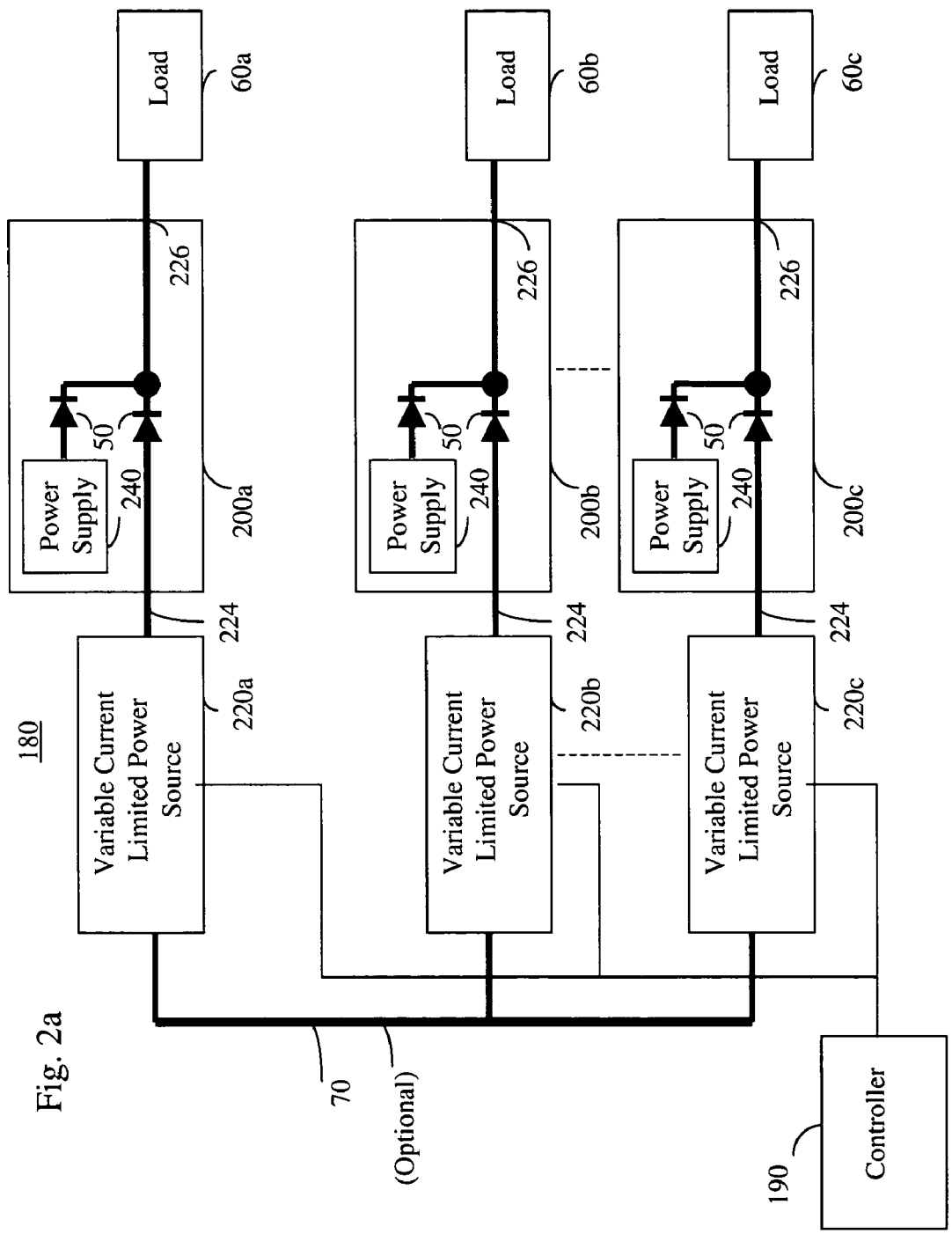

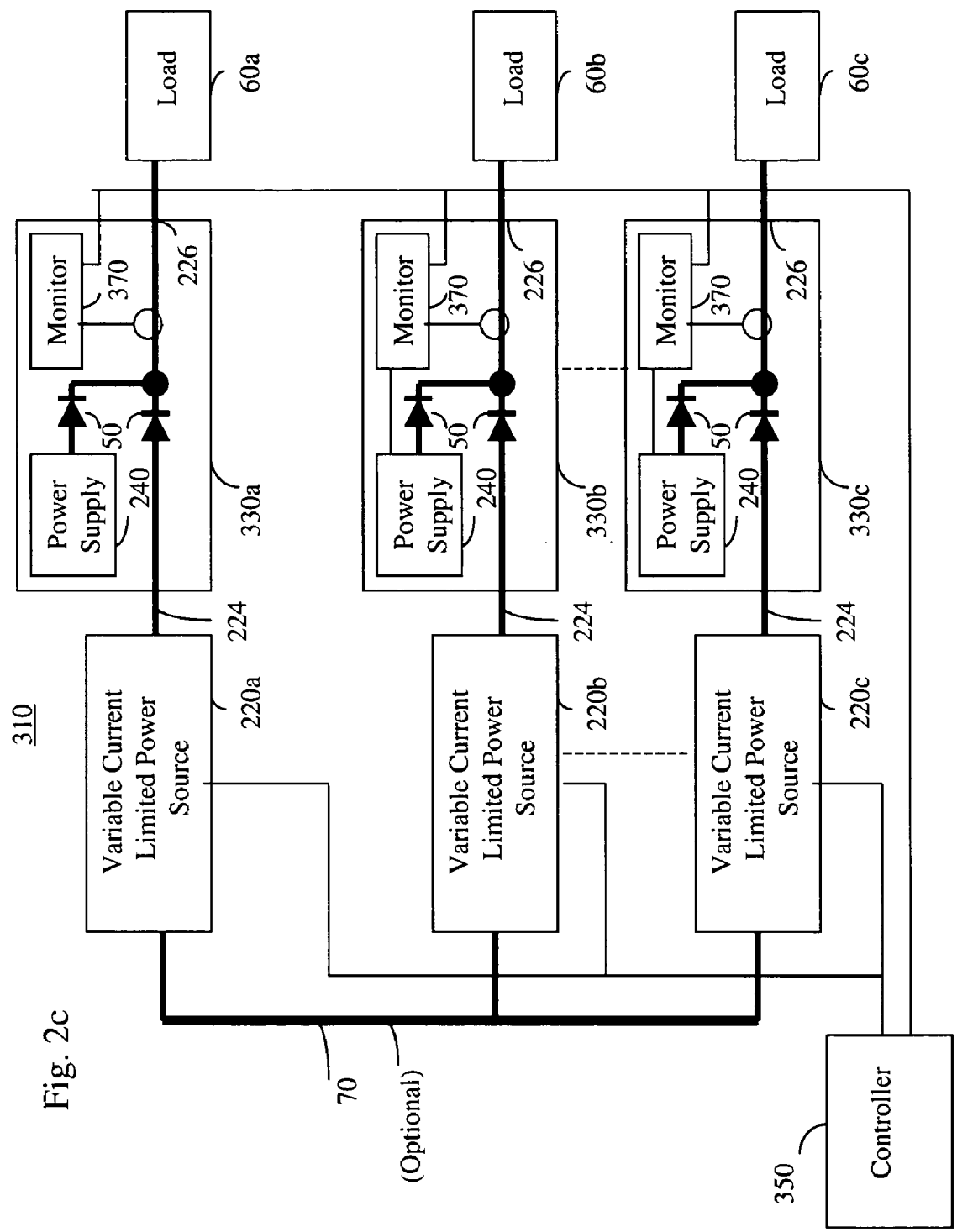

CONFIGURABLE MULTIPLE POWER SOURCE SYSTEM

CROSS-REFERENCE TO RELATED APPLICATIONS

The present application is a continuation-in-part of U.S. patent application Ser. No. 10/750,908 filed Jan. 5, 2004, whose entire contents are incorporated herein by reference, which claims priority from PCT Patent Application No. PCT/IL03/00832 filed Oct. 14, 2003, which claims priority from U.S. Provisional Patent Application No. 60/418,599 filed Oct. 15, 2002, whose entire contents are incorporated herein by reference.

BACKGROUND OF THE INVENTION

The present invention relates to the field of powering a system comprising modules having internal power supplies, and in particular to a system and entities for variably supplying additional power to at least one module having an internal power supply.

Systems, such as communication systems, commonly comprise modules having internal power supplies connected to an A/C mains. In order to provide uninterrupted operation, systems often comprise a back-up power supply (BUPS) which, during failure of the internal power supply, functions to supply power to the module, or an uninterruptible power supply (UPS), which during a power interrupt of the A/C mains, functions to supply power to the module. In one embodiment the UPS can further function as a BUPS.

Certain modules, for example an Ethernet switch having power over Ethernet functionality, may on occasion have a need for additional power above that available from the internal power supply. Prior art systems require a dedicated additional external power supply to be added as a module, typically feeding the totality of the required power to the module by effectively shutting down the internal power supply. In an exemplary embodiment the external power supply is arranged in some form of a "wired or" configuration with the on-board power supply. In such an embodiment the voltage of the external power supply is set to be higher than the voltage of the internal power supply and thus power is fully supplied by the external power supply. In such an embodiment the internal power supply acts as a back-up power supply for the external power supply. Such a dedicated external power supply is often underutilized, only experiencing optimum utilization as the system power needs grow. Furthermore, the internal power supply is not being utilized except as a back-up.

U.S. Pat. No. 6,125,448 issued to Schwan et al. discloses a method and apparatus of powering components on a network by using a load-share technique and by using over-voltage and current limiting circuitry. The power subsystem for a component, also known as a node, in a network is designed in a load-share manner whereby the power subsystem will supply power to the network bus and to the component load. Under normal operation of the power subsystem, the load will be powered directly from the power subsystem. No means for supplying power to the component load simultaneously from both the power subsystem and the network bus is described.

U.S. Pat. No. 5,745,670 issued to Linde discloses a fault tolerant power supply system including a plurality of nodes coupled to a common power distribution bus. Under normal operation of the power subsystem, the load will be powered directly from the power subsystem, and excess power is available to be supplied to the bus. Upon failure of the local power supply, bus power is supplied under certain conditions. No means of sharing the load between the power subsystem and the bus is described.

There is therefore a need for an arrangement in which the utilization of both internal and external power sources is optimized and which allows for variably sharing the load simultaneously between the internal and external power source.

SUMMARY OF THE INVENTION

Accordingly, it is a principal object of the present invention to overcome the disadvantages of prior art methods of load sharing. This is provided in the present invention by supplying an internal power supply supplying power to the load, the internal power supply not being designed to accommodate power sharing, and an external variable current limited power source supplying additional power to the load. Control of the external variable current limited power source is preferably accomplished in response to information related to the load power requirements, and additional power is added without the need to adjust the internal power supply. In a preferred embodiment the output of the external variable current limited power source and internal power supply are combined in a "wired or" configuration to supply a combined power to the load.

The invention provides for a system for supplying additional power to a module having an internal power supply, the system comprising: a module having an associated power supply, the power supply not being designed to accommodate power sharing; at least one load associated with the module, the load receiving power from the power supply; a variable current limited power source connected to the module supplying additional power to the at least one load; and a controller; whereby the variable current limited power supply is responsive to an output of the controller to vary the current limit of the variable current limited power supply.

In one embodiment, the system further comprises a source power supply supplying power to the variable current limited power source, the variable current limited power source comprising a boost DC/DC converter. In a further embodiment the variable current limited power source is operable such that in the event the current limit is exceeded, the voltage output of the variable current limited power supply is substantially equal to the voltage output of the source power supply, whereby the variable current limited power supply is operable to provide back up power functionality. In a yet further embodiment, the system further comprises a current limiter, the current limiter being operable to limit current flow from the source power supply during the provided back up power functionality. In another further embodiment the system further comprises a battery back up module connected to supply power to the variable current limited power source in the event of a failure of the source power supply.

In another embodiment the variable current limited power source comprises a DC/DC converter. In yet another embodiment the variable current limited power source and the associated power supply are connected in a wired or configuration.

In another embodiment, the system further comprises a monitor in communication with the controller, the monitor being operable to communicate data relating to at least one of power output of the associated power supply and power needs of the at least one load. In a further embodiment the module further comprises a local power controller, the local power controller comprising the monitor. In a yet further embodiment the local power controller is responsive to an output of the controller to enable the power needs of the at least one load. In an even further embodiment the controller is operable in response to the communicated data to enable the power needs of the at least one load through the operation of the local power controller after varying the current limit of the variable current limited power supply.

In another embodiment the module comprises a power over Ethernet controller, the power over Ethernet controller being associated with the at least one load. In a further embodiment the power over Ethernet controller has at least one powered device attached thereto, the at least one powered devices being the at least one load. In an even further embodiment the power over Ethernet controller is responsive to an output of the controller to enable the power needs of the at least one powered device. In an even further embodiment the controller is operable to enable power the power needs of the at least one powered device, the power needs being enabled through the operation of the power over Ethernet controller after varying the current limit of the variable current limited power supply. In one further embodiment the power over Ethernet controller is compatible with the IEEE 802.3af standard.

In one embodiment the module comprises an Ethernet switch.

The invention independently provides for a system for supplying additional power to a load having an associated power supply, the system comprising: a load; a power supply associated with the load, the power supply supplying power to the load; a controller; and a variable current limited power source connected to supply power to the load cooperatively with the power supply associated with the load, the variable current limited power source being responsive to an output of the controller to vary the current limit of the variable current limited power supply; whereby the controller varies the current limit of the variable current limited power supply in response to information regarding at least one of the load and the power supply associated with the load.

In one embodiment the system further comprises a source power supply supplying power to the variable current limited power source, the variable current limited power source comprising a boost DC/DC converter. In a further embodiment the variable current limited power source is operable such that in the event the current limit is exceeded, the voltage output of the variable current limited power supply is substantially equal to the voltage output of the source power supply, whereby the variable current limited power supply is operable to provide back up power functionality. In an even further embodiment the system further comprises a current limiter, the current limiter being operable to limit current flow from the source power supply during the provided back up power functionality. In another further embodiment the system further comprises a battery back up module connected to supply power to the variable current limited power source in the event of a failure of the source power supply.

In another embodiment the variable current limited power source comprises a DC/DC converter. In yet another embodiment the variable current limited power supply and the internal power supply are connected in a wired or configuration.

In yet another embodiment the system further comprises a local power controller, the local power controller supplies the information regarding at least one of the load and the power supply associated with the load to the controller. In a further embodiment the local power controller is operable by the controller to enable the load.

In another embodiment the system further comprises a local power controller responsive to an output of the controller to enable power to the load. In a further embodiment the controller is operable to enable power to the load through the operation of the local power controller after varying the current limit of the variable current limited power supply.

In another embodiment the system further comprises a power over Ethernet controller responsive to an output of the controller to enable power to the load. In a further embodiment the power over Ethernet controller is compatible with the IEEE 802.3af standard. In another further embodiment the load is a powered device. In a yet further embodiment the controller is operable to enable power to the powered device through the operation of the power over Ethernet controller after varying the current limit of the variable current limited power supply. In another yet further embodiment the powered device is compatible with the IEEE 802.3af standard.

The invention independently provides for a method of supplying additional power to a module having an internal power supply not designed to accommodate power sharing, the method comprising: supplying a load, the load having power needs associated thereto; supplying a power supply associated with the load; supplying a variable current limited power supply, the variable current limited power supply being connected to supply additional power to the load; monitoring at least one of power output of the power supply associated with the load and power needs of the load to obtain monitored data; and varying the current limit of the variable current limited power supply in response to the monitored data.

In one embodiment the method further comprises: supplying a source power supply, the source power supply supplying power to the variable current limited power supply; and boosting the voltage supplied by the source power supply by the variable current limited power supply. In another embodiment the method further comprises enabling the power needs of the load. In a further embodiment the step of enabling is accomplished after the varying of the current limit.

In another embodiment the load is a powered device. In a further embodiment the method further comprises enabling the power needs of the powered device. In a yet further embodiment the step of enabling the power needs of the powered device is accomplished after the varying of the current limit.

Independently, the invention also provides for a method of supplying additional power to a module having an internal power supply not designed to accommodate power sharing, the method comprising: supplying a first power to a load; and supplying a variable current limited power to the load, the power needs of the load being in excess of the variable current limit, whereby the variable current limited power is fed to the load and the excess need is fed by the first power.

In one embodiment the method further comprises varying the current limit of the variable current limited power.

Independently, the invention also provides for a system for supplying additional power and back-up power to at least one load, the system comprising: a first power supply; a boost converter having a first variable current limiter, the boost converter being connected to an output of the first power supply; at least one load; a second power supply associated with the load, the second power supply having a voltage output less than the voltage output of the boost converter; and a second variable current limiter limiting the current flow from the first power supply to the at least one load, wherein the output of the second variable current limiter is connected in a wired or configuration to cooperatively supply power with the second power supply to the at least one load, and whereby in the event of a failure of the second power supply, the voltage output of the boost converter is substantially the same as the voltage output of the first power supply, and power to the load is limited by the second variable current limiter.

In one embodiment the system further comprises a controller operable to control the second variable current limiter. In a further embodiment the controller is further operable to control the first variable current limiter.

In another embodiment the limit of the second variable current limiter is set to be greater than the limit of the first variable current limiter. In yet another embodiment the limit of the second variable current limiter is set to be at least the sum of the power being cooperatively supplied by the second power supply associated with the load and the power supplied by the limit of the first variable current limiter.

In another embodiment the system further comprises a controller, the controller being operable to enable power to the at least one load. In a further embodiment the controller is operable to increase the first current limiter and the second current limiter prior to enabling power to the at least one load.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1a is high level block diagram of an embodiment of a back-up power supply system according to the prior art;

FIG. 2a is a high level block diagram of a configurable multiple power source system sharing a common load in accordance with the principle of the invention;

FIG. 2c is a high level block diagram of a configurable multiple power source system sharing a common load in accordance with the principle of the invention, in which power drawn by the load is monitored by a monitor and control is maintained over an external variable current limited power source in response to an output of the monitor;

DETAILED DESCRIPTION OF PREFERRED EMBODIMENTS

Figure 1B:
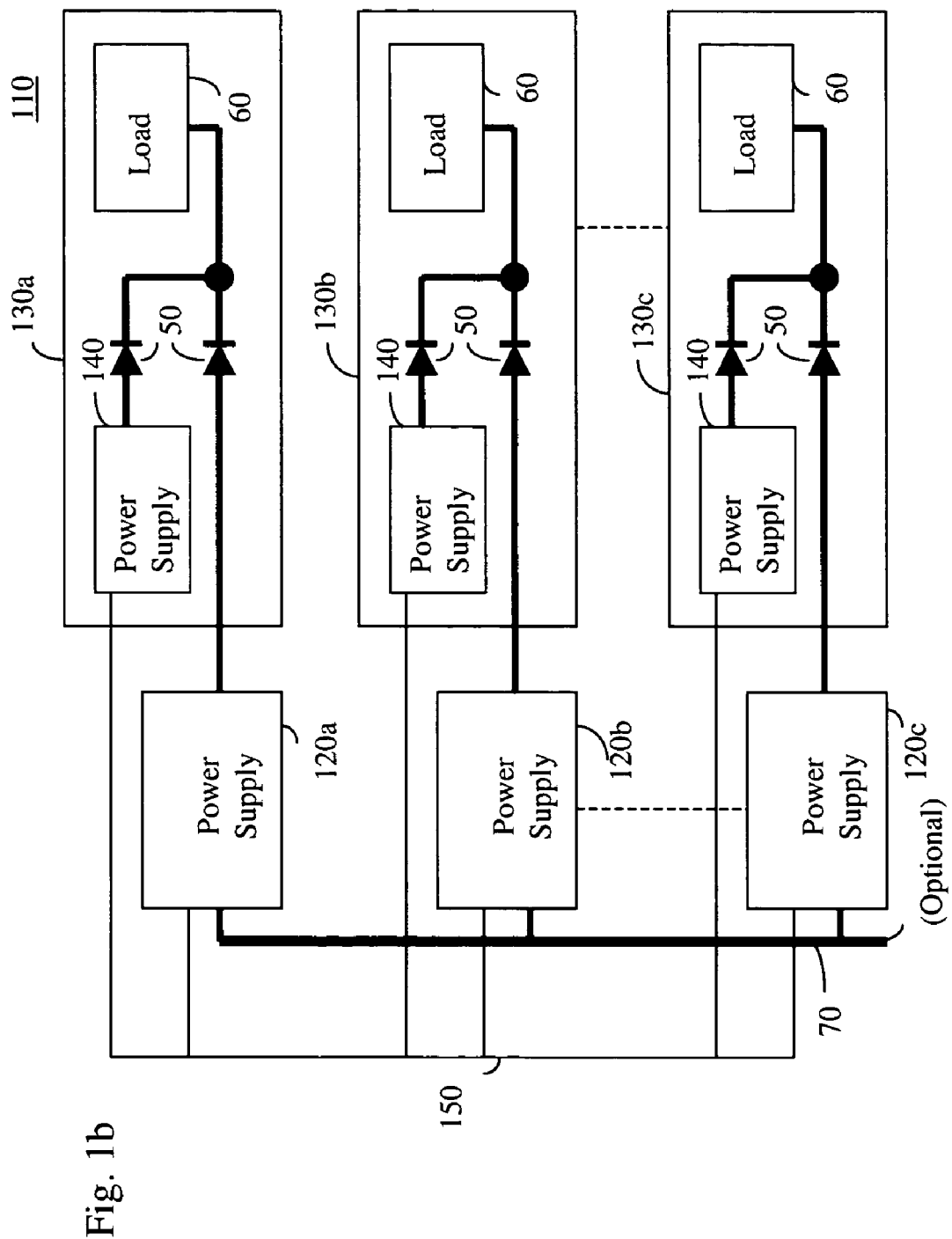
FIG. 1b is a high level block diagram of a power sharing system according to the prior art.

The present embodiments enable load sharing by multiple power sources. In a preferred embodiment at least one of the power sources is an internal power supply associated with and supplying power to a load and at least one power source is an external variable current limited power source supplying additional power to the load. Control of the external variable current limited power source is accomplished in response to monitored information related to the load power requirements, and additional power is added without the need to adjust the internal power supply. In a preferred embodiment the output of the external variable current limited power source and internal power supply are combined in a "wired or" configuration to supply a combined power to the load without control over the internal power supply.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

The terms power source and power supply are herein used interchangeably, and are meant to include any source of DC power including, but not limited to, power stages, DC/DC converters, AC/DC converters and power subsystems. In a typical environment, an internal power source comprises an AC/DC converter, and an external power source comprises a DC/DC converter. An AC/DC converter, whose output is shared between multiple external DC/DC converters, typically supplies power to the external power source. As such, and solely for convenience, the external power supply is herein designated as a power source, and the internal power supply as a power supply.

FIG. 1a is high level block diagram of an embodiment of a system 10 supplying external back-up power supply for the internal supply of a module according to the prior art comprising: external power sources 20a, 20b and 20c, generally referred to as external power source 20; modules 30a, 30b and 30c, generally referred to as module 30 and optional power bus 70. Three external power sources 20 and three modules 30 are shown, however this is not meant to be limiting in any way. Any number of external power sources 20 and modules 30 can be connected in a similar manner. Module 30 comprises internal power supply 40, first and second load sharing diodes 50 and load 60. Optional power bus 70 is connected to each of external power sources 20a, 20b and 20c, each of which, in an exemplary embodiment, comprise a DC/DC converter.

External power source 20 and internal power supply 40 are connected in a "wired or" configuration, shown as comprising first and second load sharing diodes 50, to load 60. The term "wired or" as used throughout this document is meant to include any arrangement of two or more power supplies allowing for each of the power supplies to supply power to a connected load without inflicting harm to the non-supplying power supply. It is also meant to include, where appropriate, an arrangement of two or more power supplies which are variably configured to supply shared power to at least one shared load without inflicting harm to the other power supplies. Thus, the illustration of a "wired-or" configuration is done utilizing a pair of diodes, however this is not to be considered limiting in any way. The use of FET's, transistors or other devices in place of, or in addition to, the diodes to allow for power sharing by multiple power sources is specifically included without exceeding the scope of the invention.

In operation, optional power bus 70 supplies source power to external power source 20 and external power source 20 supplies power at the appropriate voltage to load 60 through first load sharing diode 50. Internal power supply 40 is operable to supply power to load 60 through second load sharing diode 50. Power will be supplied by only one of external power source 20 and internal power supply 40, with the power being supplied by the power supply exhibiting the highest voltage. Thus, only one of external power source 20 and internal power supply 40 is operable to supply power to load 60, with the other power supply remaining on stand-by. Failure of the operating power supply will result in a drop in output voltage thus automatically shifting the load to the stand-by power supply.

FIG. 1b is a high level block diagram of a power sharing system 110 according to the prior art comprising: external power sources 120a, 120b and 120c, generally referred to as external power source 120; modules 130a, 130b and 130c, generally referred to as module 130, current share bus 150 and optional power bus 70. Three external power sources 120 and three modules 130 are shown, however this is not meant to be limiting in any way. Any number of external power sources 120 and modules 130 can be connected in a similar manner. Module 130 comprises internal power supply 140, first and second load sharing diodes 50 and load 60. External power source 120 and internal power supply 140 are connected in a "wired or" configuration comprising first and second load sharing diodes 50, to load 60. Current share bus 150 is connected to external power sources 120a, 120b and 120c and further connected to internal power supplies 140 of each of module 130a, 130b and 130c. Optional power bus 70 is connected to external power sources 120a, 120b and 120c.

In operation, optional power bus 70 supplies source power to external power source 120 and external power source 120 supplies power to load 60 through first load sharing diode 50. Internal power supply 140 supplies power to load 60 through second load sharing diode 50. Both external power source 120 and internal power supply 140 balance their share of load 60 evenly through the operation of current share bus 150. In the event of a failure of either external power source 120 or internal power supply 140; full power will be drawn from the non-failed power supply. This may cause an overload condition as, for example, the combination of external power source 120 and internal power supply 140 may be capable of supplying more power than internal power supply 140 is capable of supplying alone.

Successful operation of the load sharing arrangement of the system 110 of FIG. 1b requires current share bus 150 to feed back to both external power source 120 and internal power supply 140. Such a load sharing arrangement requires that both internal power supply 140 and external power source 120 be designed to allow for load sharing.

FIG. 2a is a high level block diagram of a multiple power source system 180 sharing a common load in accordance with the principle of the invention, in which control is maintained over an external variable current limited power source thus enabling variable power sharing between an internal power supply and the external variable current limited power source. Multiple power source system 180 comprises: variable current limited power sources 220a, 220b and 220c, generally referred to as variable current limited power source 220; modules 200a, 200b and 200c, generally referred to as module 200; loads 60a, 60b and 60c, generally referred to as load 60; controller 190 and optional power bus 70. Three variable current limited power supplies 220, modules 200 and loads 60 are shown, however this is not meant to be limiting in any way. Any number of variable current limited power supplies 220, modules 200 and loads 60 can be connected in a similar manner without exceeding the scope of the invention. Module 200 comprises external power input 224, internal power supply 240, load sharing diodes 50 and power output 226. Variable current limited power source 220 is connected to power input 224 of module 200, and load 60 is connected to power output 226 of module

200. Power supply 240 and power input 224 are connected in a "wired or" configuration through first and second load share diodes 50 to power output 226 of module 200. An output of controller 190 is connected as an input to each of variable current limited power sources 220a, 220b and 220c. Optional power bus 70 is connected to each of variable current limited power sources 220a, 220b and 220c.

In operation, optional power bus 70 supplies source power to variable current limited power source 220 and variable current limited power source 220 is operable by controller 190 to supply current limited power to load 60 through module 200. The output of variable current limited power source 220 is set to a higher voltage than the output of power supply 240 and is current limited under control of controller 190 as will be explained further hereinto below, thus enabling power sharing. The higher voltage of variable current limited power source 220 ensures that load 60 draws current from the output of variable current limited power source 220 up to the current limit, and any current draw by load 60 in excess of the current limit is supplied by internal power source 240. Internal power supply 240 thus supplies power to load 60 cooperatively with variable current limited power source 220.

Figure 2B:
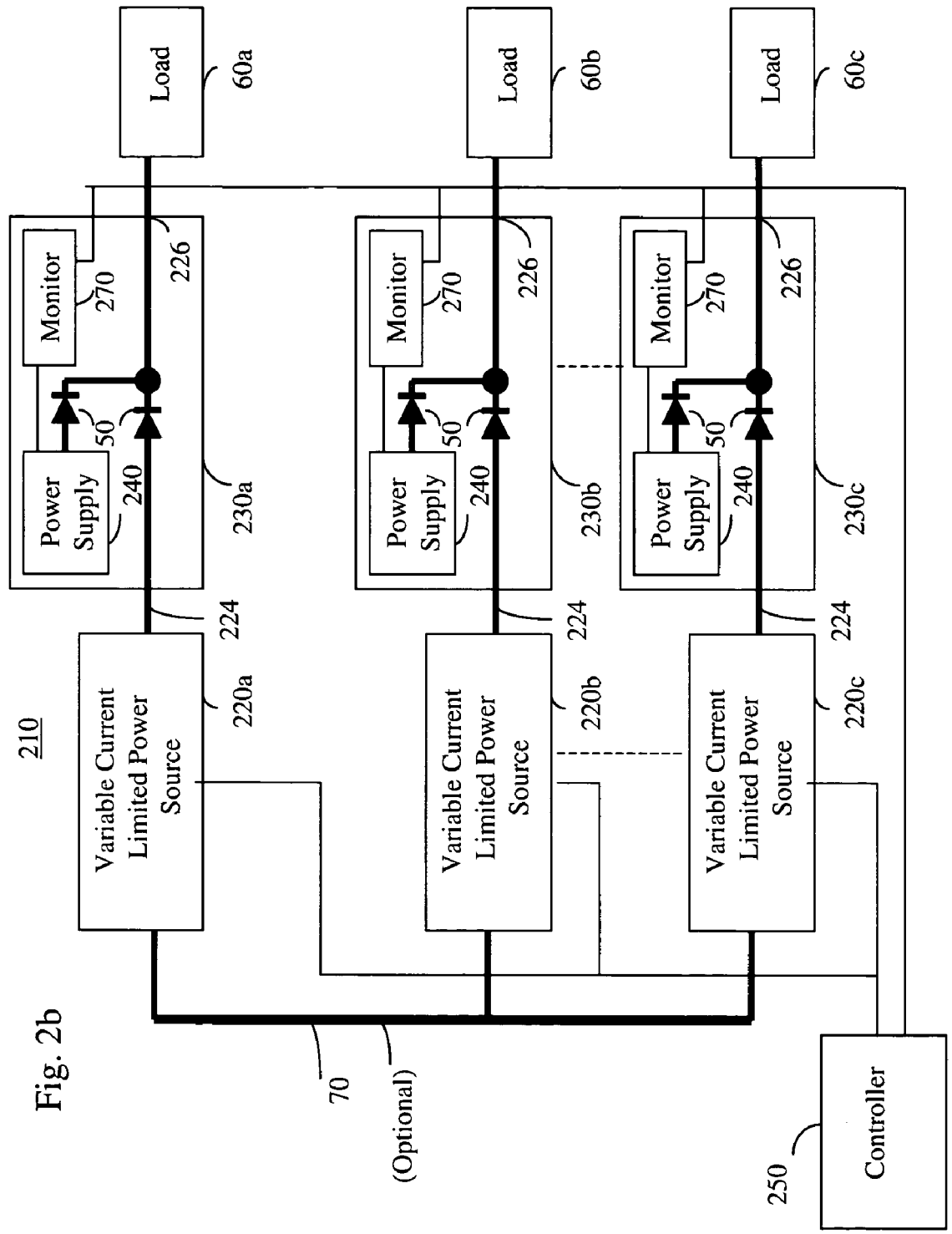
FIG. 2b is a high level block diagram of a configurable multiple power source system sharing a common load in accordance with the principle of the invention, in which an internal power supply is monitored by a monitor and control is maintained over an external variable current limited power source in response to an output of the monitor.

FIG. 2b is a high level block diagram of a multiple power source system 210 sharing a common load in accordance with the principle of the invention, in which an internal power supply is monitored by a monitor and control is maintained over an external variable current limited power source in response to an output of the monitor. Multiple power source system 210 comprises: variable current limited power sources 220a, 220b and 220c, generally referred to as variable current limited power source 220; modules 230a, 230b and 230c, generally referred to as module 230; loads 60a, 60b and 60c, generally referred to as load 60; controller 250 and optional power bus 70. Three variable current limited power supplies 220, modules 230 and loads 60 are shown, however this is not meant to be limiting in any way. Any number of variable current limited power supplies 220, modules 230 and loads 60 can be connected in a similar manner without exceeding the scope of the invention. Module 230 comprises external power input 224, internal power supply 240, monitor 270, load sharing diodes 50 and power output 226. Variable current limited power source 220 is connected to power input 224 of module 230, and load 60 is connected to power output 226 of module 230. Monitor 270 is connected to power supply 240, and an output of monitor 270 is connected to controller 250. Power supply 240 and power input 224 are connected in a "wired or" configuration through first and second load share diodes 50 to power output 226 of module 230. An output of controller 250 is connected as an input to each of variable current limited power sources 220a, 220b and 220c. Optional power bus 70 is connected to each of variable current limited power sources 220a, 220b and 220c.

In operation, optional power bus 70 supplies source power to variable current limited power source 220 and variable current limited power source 220 is operable by controller 250 to supply current limited power to load 60 through module 230. The output of variable current limited power source 220 is set to a higher voltage than the output of power supply 240 and is current limited under control of controller 250 as will be explained further hereinto below, thus enabling power sharing. The higher voltage of variable current limited power source 220 ensures that load 60 draws current from the output of variable current limited power source 220 up to the current limit, and current draw by load 60 in excess of the current limit is supplied by internal power source 240. Internal power supply 240 thus supplies power to load 60 cooperatively with variable current limited power source 220.

Monitor 270 monitors the power output of internal power supply 240 and communicates data regarding the power output to controller 250. In one embodiment, monitor 270 communicates data regarding the power capabilities of, and the power being supplied by, power supply 240. In another embodiment data regarding the operating temperature of power supply 240 is communicated. Controller 250 is operable to control the output of variable current limited power source 220 so as to enable the operation of power supply 240 within a desired operating range while sharing load 60. A unique feature of system 210 is that power sharing is accomplished without control over power supply 240. Controller 250 operates in response to data regarding internal power supply 240 received from monitor 270 to vary the current limit of variable current limited power source 220 to accomplish load sharing.

FIG. 2c is a high level block diagram of a multiple power source system 310 sharing a common load in accordance with the principle of the invention, in which power to the load is monitored by a monitor and control is maintained over an external variable current limited power source in response to an output of the monitor. Multiple power source system 310 comprises: variable current limited power sources 220a, 220b and 220c, generally referred to as variable current limited power source 220; modules 330a, 330b and 330c, generally referred to as module 330; loads 60a, 60b and 60c, generally referred to as load 60; controller 350 and optional power bus 70. Three variable current limited power supplies 220, modules 330 and loads 60 are shown, however this is not meant to be limiting in any way. Any number of variable current limited power supplies 220, modules 330 and loads 60 can be connected in a similar manner without exceeding the scope of the invention.

Module 330 comprises external power input 224, internal power supply 240, monitor 370, load sharing diodes 50 and power output 226. Variable current limited power source 220 is connected to power input 224 of module 330, and load 60 is connected to power output 226 of module 330. Monitor 370 is connected so as to monitor power drawn through power output 226, and an output of monitor 270 is connected to controller 350. Power supply 240 and power input 224 are connected in a "wired or" configuration through first and second load share diodes 50 to power output 226 of module 330. An output of controller 350 is connected as an input to each of variable current limited power sources 220a, 220b and 220c. Optional power bus 70 is connected to each of variable current limited power sources 220a, 220b and 220c.

In operation, optional power bus 70 supplies source power to variable current limited power source 220 and variable current limited power source 220 is operable by controller 350 to supply current limited power to load 60 through module 330. The output of variable current limited power source 220 is set to a higher voltage than the output of power supply 240 and is current limited under control of controller 350 as will be explained further hereinto below, thus enabling power sharing. The higher voltage of variable current limited power source 220 ensures that load 60 draws current from the output of variable current limited power source 220 up to the current limit, and any current draw by load 60 in excess of the current limit is supplied by internal power source 240. Internal power supply 240 thus supplies power to load 60 cooperatively with variable current limited power source 220.

Monitor 370 monitors the power drawn by load 60 and communicates data regarding the power drawn by load 60 to controller 350. A unique feature of system 310 is that power sharing is accomplished without control over power supply 240. Controller 350 is operable in response to data regarding power drawn by load 60 communicated by monitor 370 to vary the current limit of variable current limited power source 220 to accomplish load sharing. In an exemplary embodiment, monitor 370 further supplies the rated power capability of power supply 240. In another exemplary embodiment, controller 350 retrieves the rated power capability, and optionally the desired operating range, of power supply 240. In either of these exemplary embodiments, controller 350 sets the current limit of the associated variable current limited power supply 220 to be equal to the power drawn by load 60 minus the power desired to be drawn from power supply 240. In a preferred embodiment, the power to be drawn from power supply 240 represents a desired operating range for power supply 240.

Figure 2D:
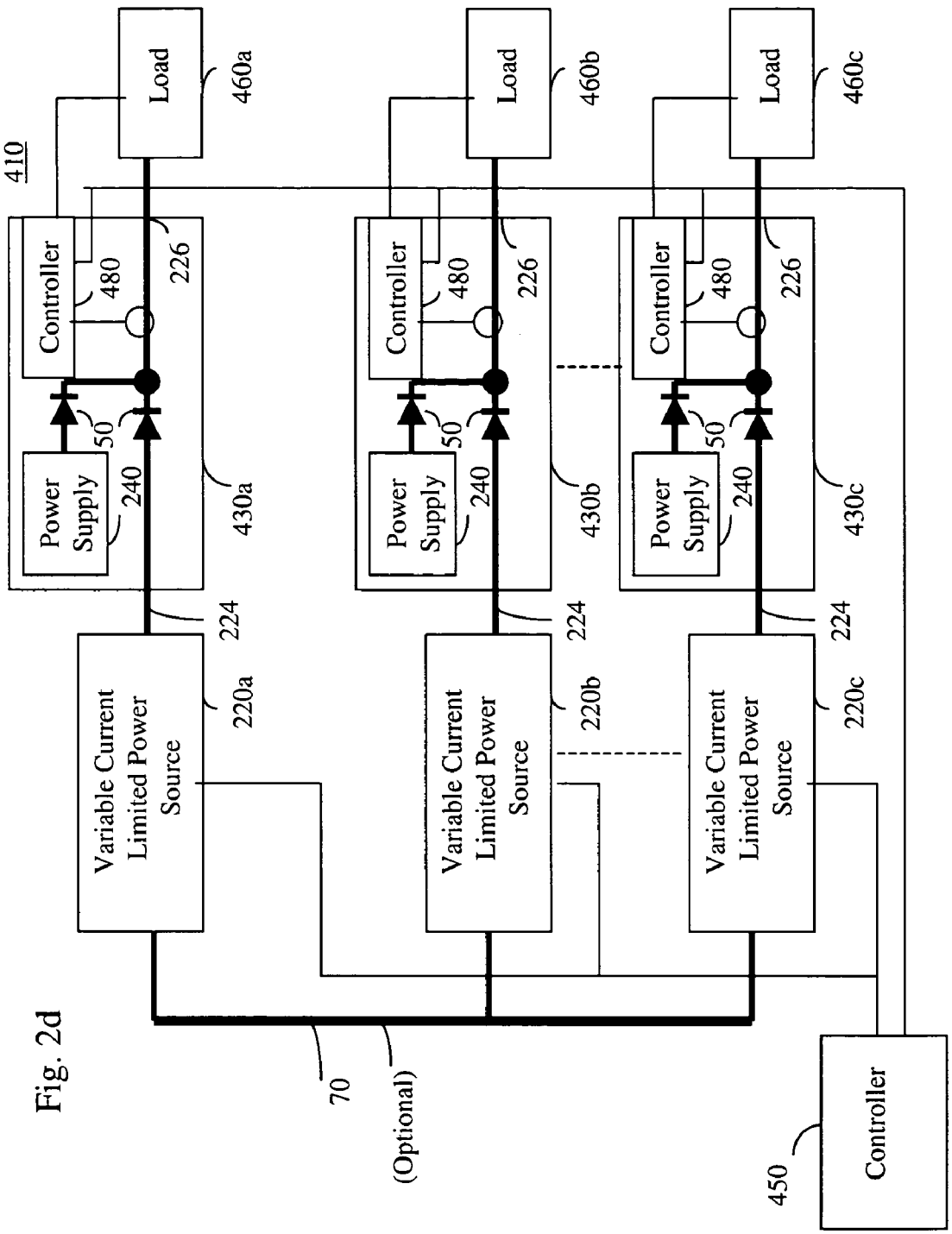
FIG. 2d is a high level block diagram of a multiple power source system sharing a common load in accordance with the principle of the invention, in which the power requirement of the load is monitored and controlled by a local power controller and control is maintained over an external variable current limited power source in response to an output of the local power controller.

FIG. 2*d* is a high level block diagram of a multiple power source system 410 sharing a common load in accordance with the principle of the invention, in which the power requirement of the load is monitored and controlled by a local power controller and control is maintained over an external variable current limited power source in response to an output of the local power controller. Multiple power source system 410 comprises: variable current limited power sources 220*a*, 220*b* and 220*c*, generally referred to as variable current limited power source 220; modules 430*a*, 430*b* and 430*c*, generally referred to as module 430; loads 460*a*, 460*b* and 460*c*, generally referred to as load 460; controller 450 and optional power bus 70. Three variable current limited power supplies 220, modules 430 and loads 460 are shown, however this is not meant to be limiting in any way. Any number of variable current limited power supplies 220, modules 430 and loads 460 can be connected in a similar manner without exceeding the scope of the invention.

Module 430 comprises external power input 224, internal power supply 240, local power controller 480, load sharing diodes 50 and power output 226. Variable current limited power source 220 is connected to power input 224 of module 430, and load 460 is connected to power output 226 of module 430. Local power controller 480 is connected to load 460 and is further connected so as to monitor power drawn through power output 226. An output of monitor local power controller 480 is connected to controller 450. Power supply 240 and power input 224 are connected in a "wired or" configuration through first and second load share diodes 50 to power output 226 of module 430. An output of controller 450 is connected as an input to each of variable current limited power sources 220*a*, 220*b* and 220*c*. Optional power bus 70 is connected to each of variable current limited power sources 220*a*, 220*b* and 220*c*.

In operation, optional power bus 70 supplies source power to variable current limited power source 220 and variable current limited power source 220 is operable by controller 450 to supply current limited power to load 460 through module 430. The output of variable current limited power source 220 is set to a higher voltage than the output of power supply 240 and is current limited under control of controller 450 as will be explained further hereinto below, thus enabling power sharing. The higher voltage of variable current limited power source 220 ensures that the load 460 draws power from the output of variable current limited power source 220 up to the current limit, and any current draw by load 460 in excess of the current limit is supplied by internal power source 240. Internal power supply 240 thus supplies power to load 460 cooperatively with variable current limited power source 220.

Local power controller 480 communicates with load 460, and receives data regarding the power needs of load 460. It is to be understood that in system 410, load 460 may request power, however the total power enabled to load 460 is limited by the operation of local power controller 480. Local power controller 480 further monitors the power usage of load 460 at output 226 and comprises the monitoring function of monitor 270 and 370 of FIGS. 2*b* and 2*c*, respectively. In one embodiment, local power controller 480 enables power requested by load 460, and in response load 460 draws additional power. In another embodiment, load 460 comprises multiple loads being individually connected to output 226 of module 430. Local power controller 480 enables power to each of the multiple loads comprising load 460 in accordance with power availability indicated by controller 450. A unique feature of system 410 is that power sharing is accomplished without control over power supply 240.

Controller 450 is operable in response to data regarding power requested by load 460 communicated by local power controller 480 to vary the current limit of variable current limited power source 220 to accomplish load sharing. In an exemplary embodiment, local power controller 480 further supplies the rated power capability of power supply 240. In another exemplary embodiment, controller 450 retrieves the rated power capability, and optionally the desired operating range, of power supply 240. In either of these exemplary embodiments, controller 450 sets the current limit of the associated variable current limited power supply 220 to be equal to the power requested by load 460 minus the power which is desired to be drawn from power supply 240. In a preferred embodiment, the power desired to be drawn from power supply 240 represents a desired operating range for power supply 240. Upon successful operation, controller 450 further signals local power controller 480 to enable the additional power to be drawn by load 460.

In a similar manner, a reduction in power needs by load 460 is communicated to controller 450 by local power controller 480. Controller 450 then acts to reduce the current limit of variable current limited power supply 220 in accordance with the reduced power needs.

In the event of a failure of either external power supply 220 or internal power supply 240 full power will be drawn from the non-failed power supply. This may cause an overload condition as, for example, the combination of external power source 220 and internal power supply 240 may be capable of supplying more power than internal power supply 240 is capable of supplying alone. Preferably, controller 450 operates variable current limited power source 220 to limit power supplied to load 460 in the event of a failure of power supply 240 so as to prevent an overload condition. Further preferably, controller 450 operates local power controller 480 to reduce the power requirements of load 60 in the event of a failure of either power supply 240 or variable current limited power source 220 so as to prevent an overload condition. Still further preferably, local power controller comprises a current limited path (not shown) for local power supply 240, the current limited path being set to a maximum safe output of local power supply 240 so as to prevent an overload condition in the event of a failure of variable current limited power supply 220.

Figure 2E:
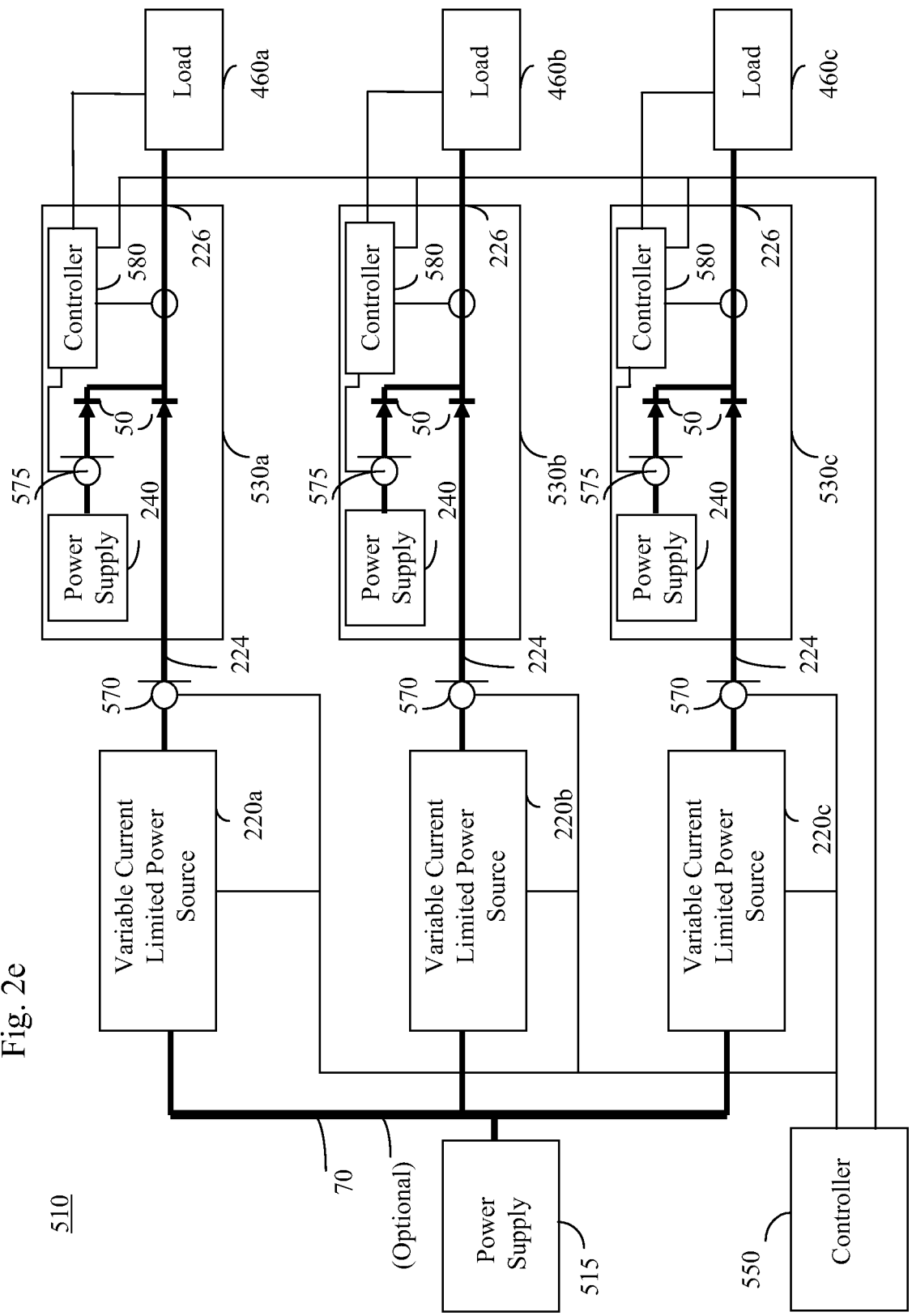
FIG. 2e is a high level block diagram of a multiple power source system sharing a common load in accordance with the principle of the invention, in which the output of an internal power supply is monitored; the power requirements of the load is monitored and controlled by a local power controller; and control is maintained over an external variable current limited power source in response to an output of the local power controller.

FIG. 2*e* is a high level block diagram of a multiple power source system 510 sharing a common load in accordance with the principle of the invention, in which the output of the internal power supply is monitored; the power requirement of the load is monitored and controlled by a local power controller; and control is maintained over an external variable current limited power source in response to an output of the local power controller. Multiple power source system 510 comprises: power supply 515; variable current limited power sources 220a, 220b and 220c, generally referred to as variable current limited power source 220; modules 530a, 530b and 530c, generally referred to as module 530; loads 460a, 460b and 460c, generally referred to as load 460; controller 550; variable current limiter 570 and optional power bus 70. Three variable current limited power supplies 220, modules 530, variable current limiter 570 and loads 460 are shown, however this is not meant to be limiting in any way. Any number of variable current limited power supplies 220, modules 530, variable current limiters 570 and loads 460 can be connected in a similar manner without exceeding the scope of the invention.

Module 530 comprises external power input 224, internal power supply 240, local power controller 580, variable current limiter 575, load sharing diodes 50 and power output 226. The output of power supply 515 is connected via optional power bus 70 to each of variable current limited power sources 220a, 220b and 220c. Variable current limited power source 220 is connected to power input 224 of module 530 via a respective variable current limiter 570, and load 460 is connected to power output 226 of module 530. Local power controller 580 is connected to load 460, and to variable current limiter 575, so as to monitor power output 226 and optionally so as to monitor the output of power supply 240. An output of local power controller 580 is connected to controller 550. Power supply 240 connected through variable current limiter 575, and power input 224 are connected in a "wired or" configuration through first and second load share diodes 50 to power output 226 of module 530. An output of controller 550 is connected as an input to each of variable current limited power sources 220a, 220b and 220c, and as an input to each variable current limiter 570. Optional power bus 70 is connected to each of variable current limited power sources 220a, 220b and 220c and supplies power from power supply 515 thereto.

In operation, optional power bus 70 supplies source power to variable current limited power source 220 and variable current limited power source 220 is operable by controller 550 to supply current limited power to load 460 through variable current limiter 570 and module 530. The output of variable current limited power source 220 is set to a higher voltage than the output of power supply 240 and is current limited under control of controller 450 as will be explained further hereinto below, thus enabling power sharing. The higher voltage of variable current limited power source 220 ensures that load 460 draws current from the output of variable current limited power source 220 up to the current limit, and any current draw by load 460 in excess of the current limit is supplied by internal power source 240. Internal power supply 240 thus supplies power to load 460 cooperatively with variable current limited power source 220.

Local power controller 580 communicates with load 460, and receives data regarding the power needs of load 460. It is to be understood that in system 510, load 460 may request power, however the total power enabled to load 460 is limited by the operation of local power controller 580. In one embodiment, local power controller 580 enables power requested by load 460, and in response load 460 draws additional power. In another embodiment, load 460 comprises multiple loads being individually connected to outputs 226 of module 530. Local power controller 580 enables power to each of the multiple loads comprising load 460 in accordance with power availability indicated by controller 550. Local power controller 580 further monitors the power usage of load 460 through output 226 and comprises the monitoring function of monitor 270, 370 of FIGS. 2a and 2b, respectively. A unique feature of system 510 is that power sharing is accomplished without control over power supply 240, and both variable current limited power source 220 and power supply 240 are protected against overload in the event of a failure of the other power source.

Controller 550 is operable in response to data regarding power requested and drawn by load 460, and the current output of power supply 240, and optionally further data such as the temperature of power supply 240, communicated by local power controller 580 to vary the current limit of variable current limited power source 220 to accomplish load sharing. In an exemplary embodiment, local power controller 580 further supplies the rated power capability of power supply 240. In another exemplary embodiment, controller 550 retrieves the rated power capability, and optionally the desired operating range, of power supply 240. In either of these exemplary embodiments, controller 550 sets the current limit of the associated variable current limited power supply 220 to be equal to the power requested by load 460 minus the power which is desired to be drawn from power supply 240. In a preferred embodiment, the power that is desired to be drawn from power supply 240 represents a desired operating range for power supply 240. Further preferably, the desired operating range is varied based on data received from local power controller 580 regarding the current status and output of power supply 240. In an exemplary embodiment, the temperature of power supply 240 is taken into account in setting the current desired operating range.

Upon successful operation, controller 550 sets variable current limiter 570 to allow at least the total amount of current being authorized for load 460. Controller 550 further signals local power controller 480 to enable the additional power to be drawn by load 460 and to set variable current limiter 575 to a maximum safe operating range for power supply 240.

In a similar manner, a reduction in power needs by load 460 is communicated to controller 550 by local power controller 580, which then acts to reduce the current limit of variable current limited power supply 220 in accordance with the reduced power needs. Controller 550 further acts to reduce the current limit of current limiter 570, and depending on the value of current being authorized for load 460 may further act to reset variable current limiter 575. The above has been described as controller 550 sending complete authorization to local power controller 580, in order for local power controller 580 to enable power to load 460, however this is not meant to be limiting in any way. In one embodiment, a range of power is authorized by controller 550 to local power controller 580, thus enabling fast operation. In such an embodiment, local power controller 580 communicates its actions to controller 550, which then acts to set variable current limited power source 220 and variable current limiter 570 in accordance with the actions of local power controller 580.

In the event of a failure of either external power supply 220 or internal power supply 240, current which is limited by the setting of variable current limiter 570 and 575 respectively, will be drawn from the non-failed power supply. The use of variable current limiters 570, 575 thus prevents an overload condition for either variable current limited power supply 220 or power supply 240. Furthermore, variable current limiter 570 prevents an overload of power supply 220 from spilling over to optional power bus 70. In an exemplary embodiment, power supply 515 supplies power at a voltage lower than that of power supply 240, and variable current limited power source 220 acts as a boost converter. In the event of a failure of power supply 240, variable current limited power source 220 is unable to maintain the boost voltage, and power is passed through near the lower voltage of power supply 515 to the respective module 530 limited by variable current limiter 570.

System 510 has been described as using variable current limiters 570 and 575, however this is not meant to be limiting in any way. Fixed current limiters may be substituted for either or both of variable current limiters 570 and 575 without exceeding the scope of the invention. Furthermore, variable current limiter 570 may be placed at the input of variable current limited power supply 220 without exceeding the scope of the invention. In one embodiment variable current limiter 575 may be substituted with an inner current limit of power supply 240.

Figure 3:
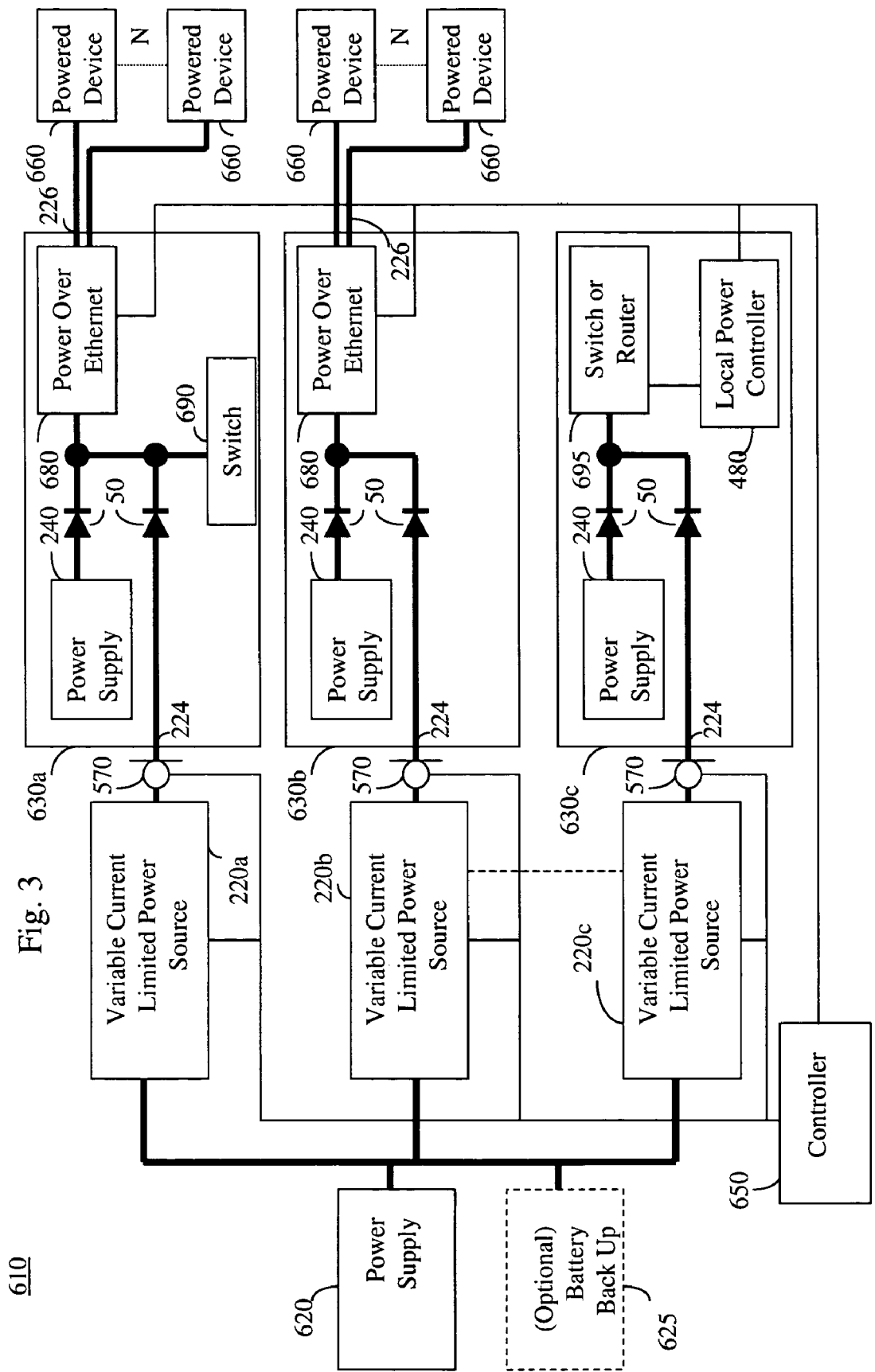
FIG. 3 is a high level block diagram of a multiple power source system sharing a plurality of load types, at least one of the load types being a power over Ethernet controller, in accordance with the principle of the invention.

FIG. 3 is a high level block diagram of a multiple power source system 610 having a plurality of load types, at least one of the load types having a power over Ethernet controller, in accordance with the principle of the invention. The power over Ethernet controller enables power to the attached multiple powered devices in cooperation with a controller, and control is maintained over an external variable current limited power source by the controller in response to an output of the power over Ethernet controller. Multiple power source system 610 comprises: variable current limited power sources 220a, 220b and 220c, generally referred to as variable current limited power source 220; variable current limiter 570; modules 630a, 630b and 630c, generally referred to as module 630; powered devices 660; controller 650, source power supply 620 and optional battery back up module 625. Three variable current limited power supplies 220 and modules 630 are shown, however this is not meant to be limiting in any way. Any number of variable current limited power supplies 220; variable current limiters 570; modules 630a, 630b with associated N powered devices 660; and modules 630c can be connected in a similar manner without exceeding the scope of the invention.

Module 630a comprises external power input 224, internal power supply 240, power over Ethernet controller 680, Ethernet switch 690, load sharing diodes 50 and power outputs 226. Variable current limited power source 220 is connected through variable current limiter 570 to power input 224 of module 630a, and N outputs of Power over Ethernet controller 680 are connected to power output 226. N powered devices are connected to respective power outputs 226 of module 630a. An output of power over Ethernet controller 680 is connected to controller 650. Power supply 240 and power input 224 are connected in a "wired or" configuration through first and second load share diodes 50 to power over Ethernet controller 680 and Ethernet switch 690.

Module 630b comprises external power input 224, internal power supply 240, power over Ethernet controller 680, load sharing diodes 50 and power outputs 226. Variable current limited power source 220 is connected through variable current limiter 570 to power input 224 of module 630b, and N outputs of Power over Ethernet controller 680 are connected to supply power outputs 226. N powered devices 660 are connected to respective power outputs 226 of module 630b. An output of power over Ethernet controller 680 is connected to controller 650. Power supply 240 and power input 224 are connected in a "wired or" configuration through first and second load share diodes 50 to power over Ethernet controller 680.

Module 630c comprises external power input 224, internal power supply 240, switch or router 695 acting as a load; local power controller 480 and load sharing diodes 50. Variable current limited power source 220 is connected through variable current limiter 570 to power input 224 of module 630c. Power supply 240 and power input 224 are connected in a "wired or" configuration through first and second load share diodes 50 to switch or router 695. Local power controller 480 is connected to switch or router 695 and to controller 650.

An output of controller 650 is connected as an input to each of variable current limited power sources 220a, 220b and 220c and as an input to each variable current limiter 570. Optional power bus 70 is connected to each of variable current limited power sources 220a, 220b and 220c.

In operation, optional power bus 70 supplies source power to variable current limited power source 220 and variable current limited power source 220 is operable by controller 650 to supply current limited power to power over Ethernet controller 680, Ethernet switch 690 and switch or router 695 of modules 630a, 630b and 630c, respectively through variable current limiter 570. The output of variable current limited power source 220 is set to a higher voltage than the output of power supply 240 and is current limited under control of controller 650 as will be explained further hereinto below, thus enabling power sharing. The higher voltage of variable current limited power source 220 ensures that current drawn by power over Ethernet controller 680, Ethernet switch 690 and switch or router 695 of modules 630a, 630b and 630c, respectively, is drawn from the output of variable current limited power source 220 up to the current limit. Any current drawn by power over Ethernet controller 680, Ethernet switch 690 and switch or router 695 of modules 630a, 630b and 630c, respectively in excess of the current limit is supplied by internal power source 240. Internal power supply 240 thus supplies power cooperatively with variable current limited power source 220.

Power over Ethernet controller 680 communicates with N powered devices 660, and calculates the total power needs of connected N powered devices 660. In a preferred embodiment, power over Ethernet controller 660 calculates the total required power based on a classification sensed from each of attached powered devices 660. In another preferred embodiment, power over Ethernet controller 660 calculated the total required power based on actual power drawn by at least some of the attached power devices 660. It is to be understood that in system 610, a powered device 660 may be attached which will not be powered until power over Ethernet controller 680 confirms that sufficient power is available to power the powered device 660. Preferably, power over Ethernet controller 680 is operable in accordance with the IEEE 802.3-2003af standard, which is incorporated herewith in its entirety. Power over Ethernet controller 680 thus monitors the power usage and needs of attached powered devices 660 and comprises the monitoring function of monitor 270 and 370 of FIGS. 2b and 2c, respectively. A unique feature of system 610 is that power sharing is accomplished without control over power supply 240.

Controller 650 is operable in response to data regarding power needs as advised by power over Ethernet controller 680 of modules 630a and 630b, and local power controller 480 of module 630c to vary the current limit of variable current limited power source 220 to accomplish load sharing. In an exemplary embodiment, power over Ethernet controller 680 of modules 630a and 630b, and local power controller 480 of module 630c further supply the rated power capability of respective power supply 240. In another exemplary embodiment, controller 650 retrieves the rated power capability, and optionally the desired operating range, of respective power supplies 240. In either of these exemplary embodiments, controller 650 sets the current limit of the associated variable current limited power source 220 to be equal to the power requested minus the power which is desired to be drawn from the respective power supply 240. In a preferred embodiment, the power that is desired to be drawn from power supply 240 represents a desired operating range for power supply 240. In another embodiment (not shown) local power controller 480 and power over Ethernet controller 680 are operable to monitor at least one characteristic of power supply 240. In a preferred embodiment, the temperature of power supply 240 is monitored and supplied to controller 650.

Upon successful operation, controller 650 sets variable current limiter 570 to allow at least the total amount of current being authorized. Controller 650 further signals power over Ethernet controller 680 and local power controller 480 to enable the additional power to be drawn by N powered devices, switch 690 and switch or router 695, respectively.

In a similar manner, a reduction in power needs by power over Ethernet controller 680 and local power controller 480, respectively, is communicated to controller 650 which then acts to reduce the current limit of variable current limited power supply 220 in accordance with the reduced power needs. Controller 650 further acts to reduce the current limit of current limiter 570. The above has been described as controller 650 sending complete authorization to local power controller 480 and power over Ethernet controller 680, respectively, however this is not meant to be limiting in any way. In one embodiment, controller 650 authorizes a range of power to local power controller 480 and power over Ethernet controller 680, respectively, thus enabling fast operation. In such an embodiment, local power controller 480 and power over Ethernet controller 680, respectively, communicate their actions to controller 650, which then acts to set variable current limited power source 220 and variable current limiter 570 in accordance with the respective communicated actions of local power controller 480 and power over Ethernet controller 680.

In the event of a failure of internal power supply 240; power up to the setting of variable current limiter 570 will be drawn from the variable current limited power source 220. The use of variable current limiter 570 thus prevents an overload condition for variable current limited power supply 220. Furthermore, variable current limiter 570 prevents an overload of power supply 220 from spilling over to an overload condition for power supply 620. In an exemplary embodiment, power supply 620 supplies power at a voltage lower than that of power supply 240, and variable current limited power source 220 acts as a boost converter. In the event of a failure of power supply 240, variable current limited power source 220 is unable to maintain the boost voltage, and power is passed through near the lower voltage of power supply 620 to module 630. Power passing through at or near the voltage of power supply 620 is limited by variable current limiter 570, thus preventing overload of power supply 620 and optional battery back-up 625.

System 610 has been described as using variable current limiter 570, however this is not meant to be limiting in any way. A fixed current limiter may be substituted for variable current limiter 570 without exceeding the scope of the invention. Furthermore, variable current limiter 570 may be placed at the input to variable current limited power source 220 without exceeding the scope of the invention.

Figure 4A:
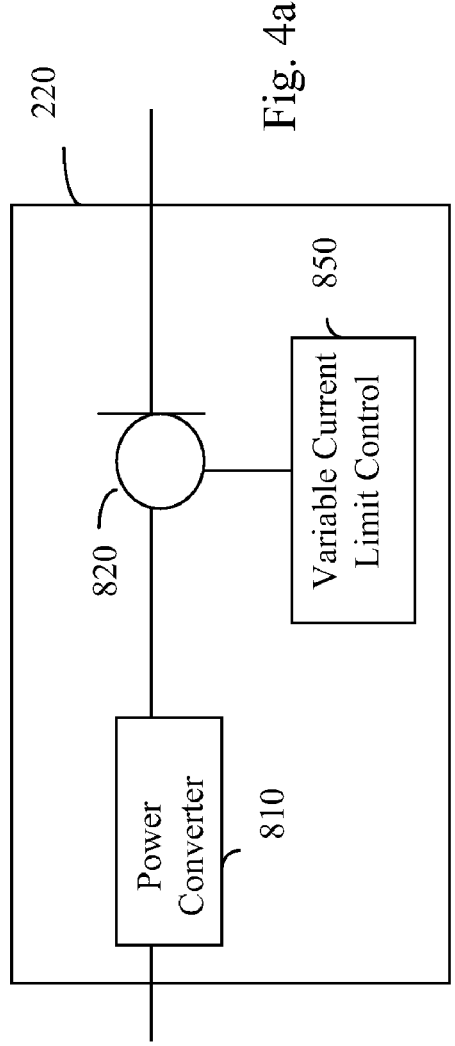
FIG. 4a is a high level block diagram of an embodiment of the variable current limited power supply of FIGS. 2a–2e and FIG. 3 in accordance with the principle of the invention.

FIG. 4a is a high level block diagram of an embodiment of variable current limited power source 220 of FIGS. 2a–2e and FIG. 3 in accordance with the principle of the invention comprising power converter 810, variable current limiter 820 and variable current limiter control 850. The output of power converter 810 is connected to the input of variable current limiter 820, and the output of variable current limiter 820 is connected as the output of variable current limited power source 220. The output of variable current limiter control 850 is connected to the control input of variable current limiter 820. In one exemplary embodiment power converter 810 comprises a DC/DC converter. In another exemplary embodiment power converter 810 comprises an AC/DC converter.

In operation power converter 810 outputs a DC voltage appropriate for the load. In a preferred embodiment the voltage output of power converter 810 is greater than the voltage supplied by power supply 240 of FIGS. 2a–2e and FIG. 3. As will explained further hereinto below, current limited power sharing is accomplished by variable current limited power source 220 balancing the output voltage through the operation of variable current limiter 820 with the output voltage of power supply 240. Load 60 of FIGS. 2a–2c, load 460 of FIG. 2d–2e, power over Ethernet controller 680, Ethernet switch 690 and switch or router 695 of FIG. 3 will each draw the maximum amount of current allowed by variable current limiter 820. The output voltage of variable current limited power source 220 will then begin to fall due to the action of variable current limiter 820. The balance of the current requirements of load 60 of FIGS. 2a–2c, load 460 of FIG. 2d–2e, power over Ethernet controller 680, Ethernet switch 690 and switch or router 695 of FIG. 3 will be drawn from respective power supply 240.

In the event that load 60 of FIGS. 2a–2c, load 460 of FIG. 2d–2e, power over Ethernet controller 680, Ethernet switch 690 and switch or router 695 of FIG. 3 require less current that the limit set by variable current limiter 820, power will be exclusively supplied by power converter 810, and the output voltage of variable current limited power source 220 will rise to a level not greater than the output of power converter 810.

Figure 4B:
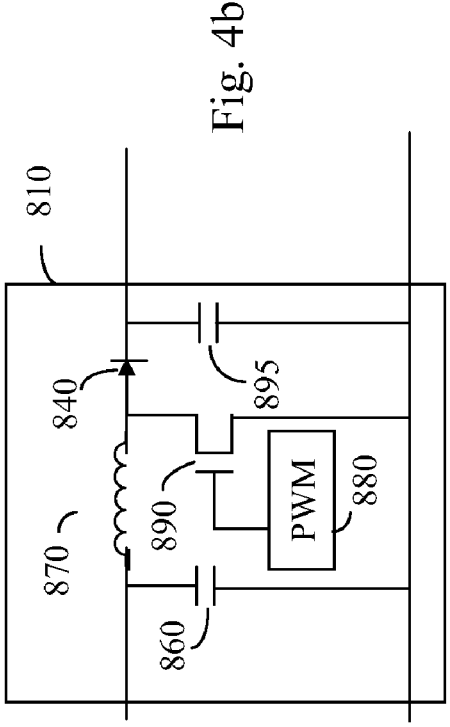
FIG. 4b is a high level schematic diagram of an embodiment of the DC/DC converter of FIG. 4a in accordance with the principle of the invention.

FIG. 4b is a high level schematic diagram of an embodiment of power converter 810 of FIG. 4a, shown as a DC/DC converter comprising input capacitor 860, inductor 870, pulse width modulation or resonance controller 880, switch 890, diode 840 and output capacitor 895. In operation DC/DC converter 810 operates as a boost converter under control of pulse width modulation controller 880 to increase the DC output voltage above the input voltage.

Figure 4C:
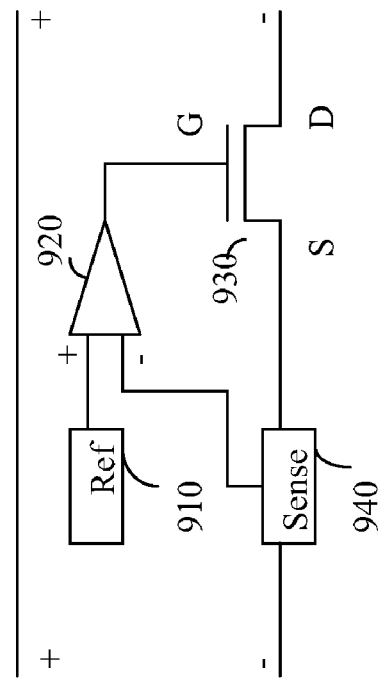
FIG. 4c is a high level schematic diagram of an embodiment of the variable current limiter of FIG. 4a in accordance with the principle of the invention.

FIG. 4c is a high level schematic diagram of an embodiment of variable current limiter 820 of FIG. 4a comprising variable reference voltage source 910, comparator 920, switch 930 and current sensor 940. In an exemplary embodiment switch 930 comprises an n-channel FET and current sensor 940 comprises a resistor. For clarity, the figure will be further explained in relation to the exemplary embodiment, however this is not meant to be limiting in any way.

The output of variable reference voltage 910 is connected as a positive input to comparator 920, and the output of comparator 920 is connected to the gate of n-channel FET 930 functioning as an electronic switch. The source of n-channel FET 930 is connected to the negative input of comparator 920 and to one end of sensing resistor 940. The second end of sensing resistor 940 is connected to the negative power input lead. The drain of n-channel FET 930 is connected to the negative output lead of variable current limiter 820.

In operation, a voltage drop across sensing resistor 940 is compared to variable reference voltage source 910. Variable reference voltage source 910 operates in response to an output of variable current limit control 850 of FIG. 4a to set a current limit by way of a reference voltage. In the event that the voltage drop across sensing resistor 940 is less than variable reference voltage source 910, n-channel FET 930 will continue to conduct. In the event that the voltage drop across sensing resistor 940 is greater than variable reference voltage source 910, n-channel FET 930 will stop conducting. The combination of sensing resistor 940 and variable reference voltage source 910 thus enable a variable current limiter. Varying variable reference voltage source 910 is translated into a change in the current limit of variable current limiter 820.

Figure 4D:
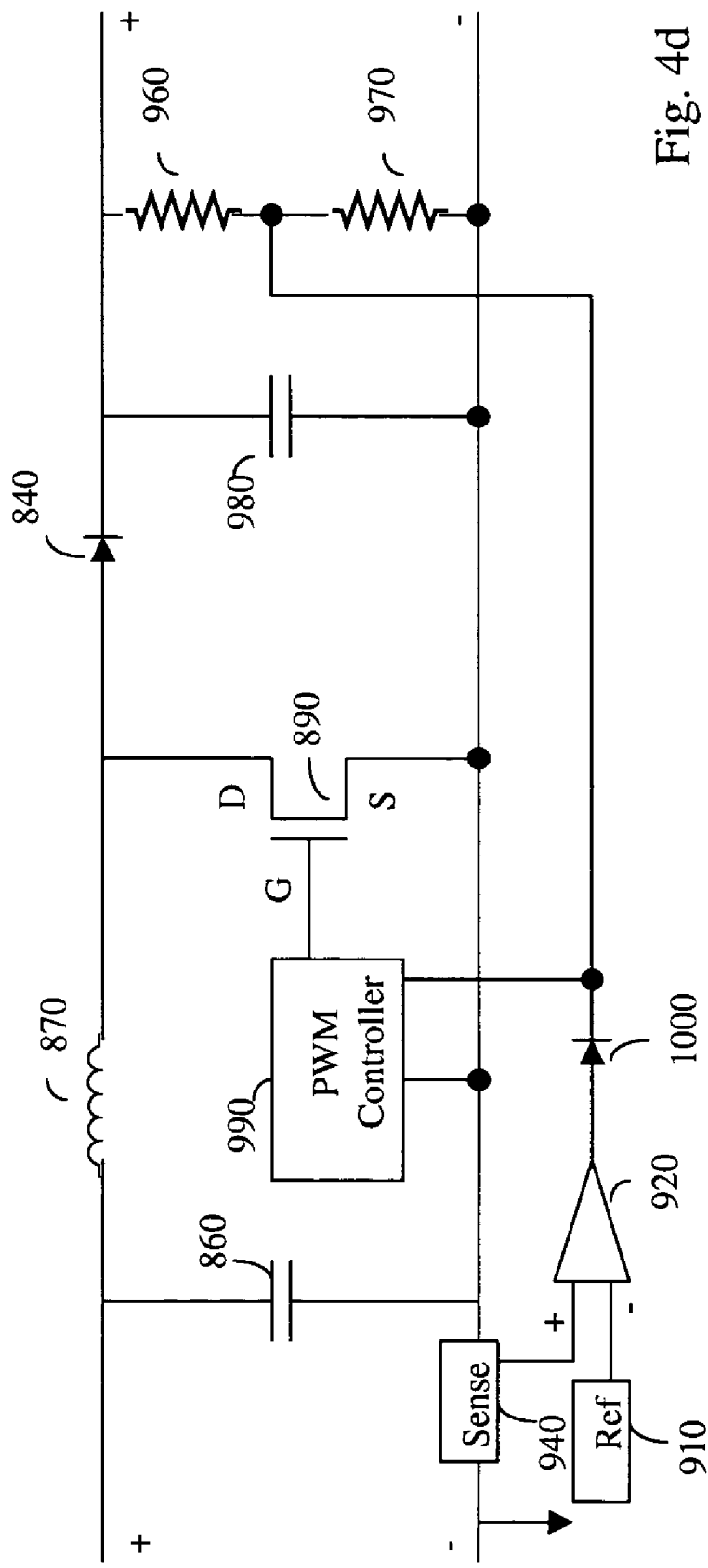
FIG. 4d is a high level schematic diagram of another embodiment of the variable current limited power supply of FIGS. 2a–2e and FIG. 3 in accordance with the principle of the invention.

FIG. 4d is a high level schematic diagram of an embodiment of variable current limited power source 220 of FIGS. 2a–2e and FIG. 3 comprising an integrated DC/DC converter and variable current limiter in accordance with the principle of the invention. Variable current limited power source 220 of FIG. 4d comprises: input capacitor 860, inductor 870, switch 890, rectifying diode 840, output capacitor 980, voltage divider resistors 960 and 970, controller 990, current sensor 940, comparator 920, variable reference voltage source 910, and diode 1000. In an exemplary embodiment current sensor 940 comprises a resistor.

A first end of input capacitor 860 is connected to the positive input lead from source power supply 620 (not shown), and a second end of input capacitor 860 is connected to the return path from the output of variable current limiter 220. A first end of inductor 870 is connected to the first end of input capacitor 860, and a second end of inductor 870 is connected to an input of switch 890. In a preferred embodiment switch 890 comprises an n-channel FET, and the second end of inductor 870 is connected to the drain input of switch 890. The anode of rectifying diode 840 is connected to the second end of inductor 870 and the cathode of rectifying diode 840 is connected to one end of both resistor 960, one end of output capacitor 980 and the positive output lead of variable current limited power source 220.

A second end of resistor 960 is connected to one end of resistor 970, and a second end of resistor 970 is connected to the negative output lead of variable current limited power source 220. The combination of resistor 960 and 970 are thus connected across the output of variable current limited power source 220 and form a voltage divider. A second end of output capacitor 980 is connected to the negative output lead of variable current limited power source 220, and to the output of switch 890, which in the preferred embodiment is the source output of an n-channel FET. The output of switch 890 is further connected to one end of current sensor 940, and a second end of current sensor 940 is connected to the negative input lead of variable current limited power supply 220. The positive input of comparator 920 is connected to current sensor 940, and the negative input of comparator 920 is connected to variable voltage reference source 910. The output of comparator 920 is connected through diode 1000 to a first input of controller 990, and a second input of controller 990 is connected to the output of variable current limited power supply 220. The first input of controller 990 is further connected to the second end of resistor 960. In an exemplary embodiment controller 990 is a pulse width modulation resonance controller.

In operation, the combination of input capacitor 860, inductor 870, switch 890, rectifying diode 840 and output capacitor 980 act as a boost converter similar to power converter 810 of FIG. 4b. Current sensor 940 in combination with variable voltage reference 910 and comparator 920 act as a current limiter, feeding back to controller 990. Controller 990 further receives feedback information from the voltage divider formed by resistors 960 and 970 to ensure a pre-set voltage output.

The voltage of optional power bus 70 of FIGS. 2a–2e, and of source power supply 620 and optional battery back up 625 of FIG. 3, is selected to be lower than the voltage output of power supply 240. Thus, when power supply 240 is operating, and the current being supplied by variable current limited power source 220 of FIG. 4d is within its current limit, power is supplied by both power supply 240 and variable current limited power source 220 through current share diodes 50. Advantageously, in the event of a failure of power supply 240 of any of FIGS. 2a–2e and FIG. 3, variable current limited power source 220 of FIG. 4d is unable to supply boost voltage at the required current and instead passes the input voltage through inductor 870 and diode 840 directly to the load. Thus, back up power is supplied directly from optional power bus 70 of FIGS. 2a–2e, and source power supply 620 and optional battery back up 625 of FIG. 3 to load 60 of FIGS. 2a14 2c; load 460 of FIGS. 2d–2e; power over Ethernet controller 680, Ethernet switch 690 and switch or router 695 of FIG. 3, respectively. Such an operation is advantageous in that back up power is automatically supplied in the event of failure of internal power supply 240. However, this is not meant to be limiting in any way, and a step down converter can be utilized as power converter 810 without exceeding the scope of the invention.

Figure 5A:
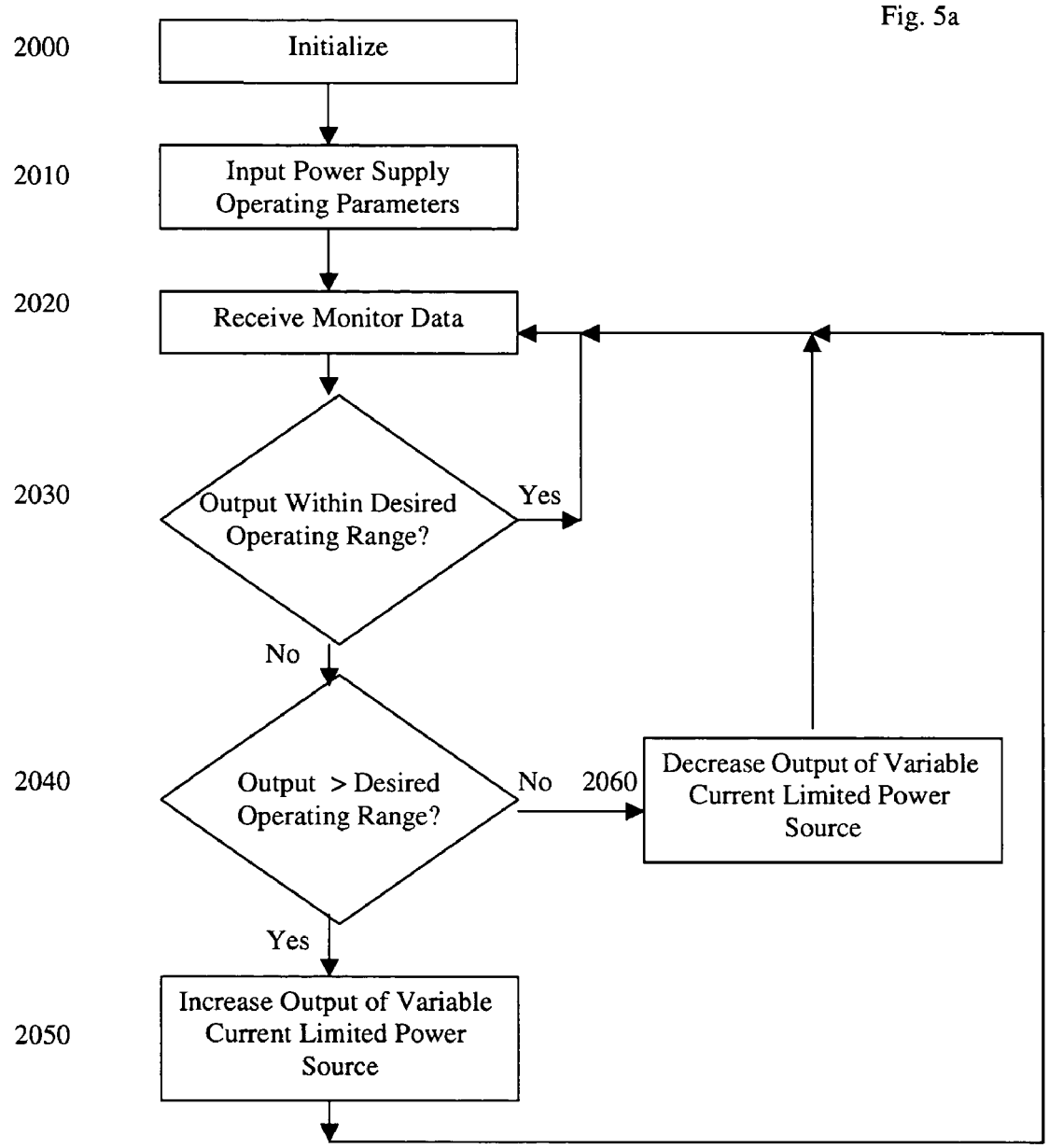
FIG. 5a is a high level flow chart of an embodiment of the operation of the controller of FIG. 2b in accordance with the principle of the invention.

FIG. 5a is a high level flow chart of an embodiment of the operation of controller 250 of FIG. 2b in accordance with the principle of the invention. In step 2000, controller 250 initializes. In step 2010, controller 250 inputs the operating parameters of the associated power supply 240. Preferably, the operating parameters included both a desired operating range and a maximum power output.

In step 2020 controller 250 receives data from monitor 270 regarding the power output of power supply 240. In a first preferred embodiment controller 250 requests the data from monitor 270. In a second preferred embodiment monitor 270 sends the data on a periodic basis. In a third preferred embodiment monitor 270 sends data when a substantial change occurs in the output of power supply 240.

In step 2030 the power output of power supply 240 as indicated by the data received in step 2020 is compared to the power supply operating parameters input in step 2010. In the event that the power output of power supply 240 is within the desired operating range, step 2020 as described above is performed.

In the event that in step 2030 the power output of power supply 240 is not within the desired operating range, in step 2040, the power output of power supply 240 is compared to the supply operating parameters loaded in step 2010. In the event that the power output of power supply 240 exceeds the desired operating range, in step 2050 controller 250 operates to increase the output of variable current limited power source 220. In a preferred embodiment the output of variable current limited power source 220 is increased in discrete steps. In a non-limiting example, the output of variable current limited power source 220 is increased in 50 watt steps, by modifying the setting of the current limiter of variable current limited power source 220. After operation of step 2050, step 2020 as described above is performed.

In the event that in step 2040 the power output of power supply 240 does not exceed the desired operating range, and therefore the power output of power supply 240 is less than the desired operating range, in step 2060 controller 250 operates to decrease the output of variable current limited power source 220. In a preferred embodiment the output of variable current limited power source 220 is decreased in discrete steps. In a non-limiting example, the output of variable current limited power source 220 is decreased in 50 watt steps, by modifying the setting of the current limiter of variable current limited power source 220. After operation of step 2060, step 2020 as described above is performed.

Figure 5B:
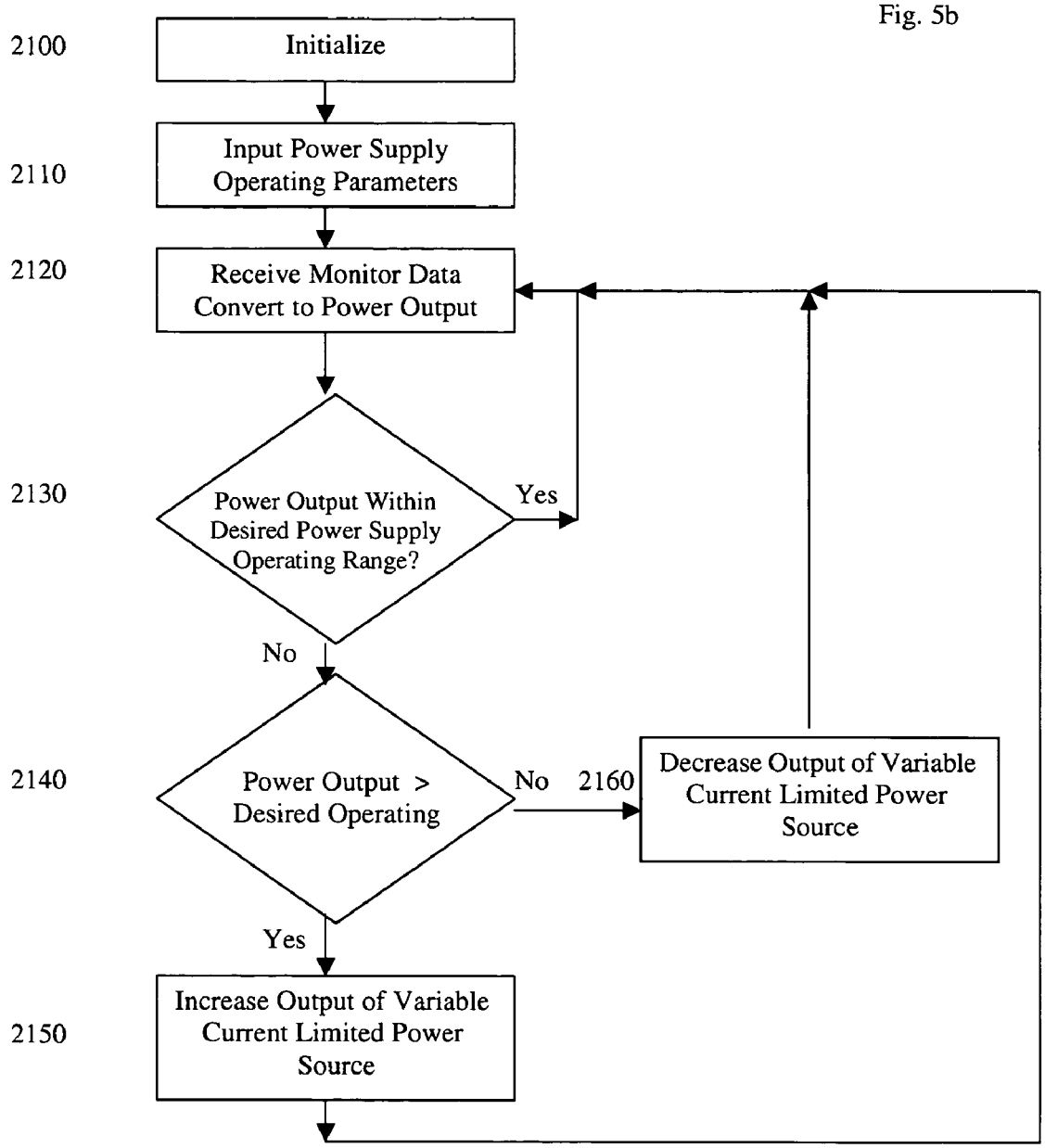
FIG. 5b is a high level flow chart of an embodiment of the operation of the controller of FIG. 2c in accordance with the principle of the invention.

FIG. 5b is a high level flow chart of an embodiment of the operation of controller 350 of FIG. 2c in accordance with the principle of the invention. In step 2100, controller 350 initializes. In step 2110, controller 350 inputs the operating parameters of the associated power supply 240. Preferably, the operating parameters included both a desired operating range and a maximum power output.

In step 2120 controller 350 receives data from monitor 370 regarding the power drawn by load 60. In a first preferred embodiment controller 350 requests the data from monitor 370. In a second preferred embodiment monitor 370 sends the data on a periodic basis. In a third preferred embodiment monitor 370 sends data when a substantial change occurs in the power drawn by load 60. The power output of power supply 240 is equal to, or a function of, the power being drawn by load 60 less any power being supplied by variable current limited power source 220. The data received from monitor 370 is thus converted to a calculation of power output of power supply 240.

In step 2130 the power drawn by load 60 as indicated by the data received in step 2120 is compared to the power supply operating parameters input in step 2110. In the event that the power output of power supply 240 is within the desired operating range, step 2120 as described above is performed.

In the event that in step 2130 the power output of power supply 240 is not within the desired operating range, in step 2140, the power output of power supply 240 is compared to the supply operating parameters input in step 2110. In the event that the power output exceeds the desired operating range, in step 2150 controller 350 operates to increase the output of variable current limited power source 220. In a preferred embodiment the output of variable current limited power source 220 is increased in discrete steps. In a non-limiting example, the output of variable current limited power source 220 is increased in 50 watt steps, by modifying the setting of the current limiter of variable current limited power source 220. After operation of step 2150, step 2120 as described above is performed.

In the event that in step 2140 the power output of power supply 240 does not exceed the desired operating range, and therefore the power output of power supply 240 is less than the desired operating range, in step 2160 controller 350 operates to decrease the output of variable current limited power source 220. In a preferred embodiment the output of variable current limited power source 220 is decreased in discrete steps. In a non-limiting example, the output of variable current limited power source 220 is decreased in 50 watt steps, by modifying the setting of the current limiter of variable current limited power source 220. After operation of step 2160, step 2120 as described above is performed.

Figure 5C:
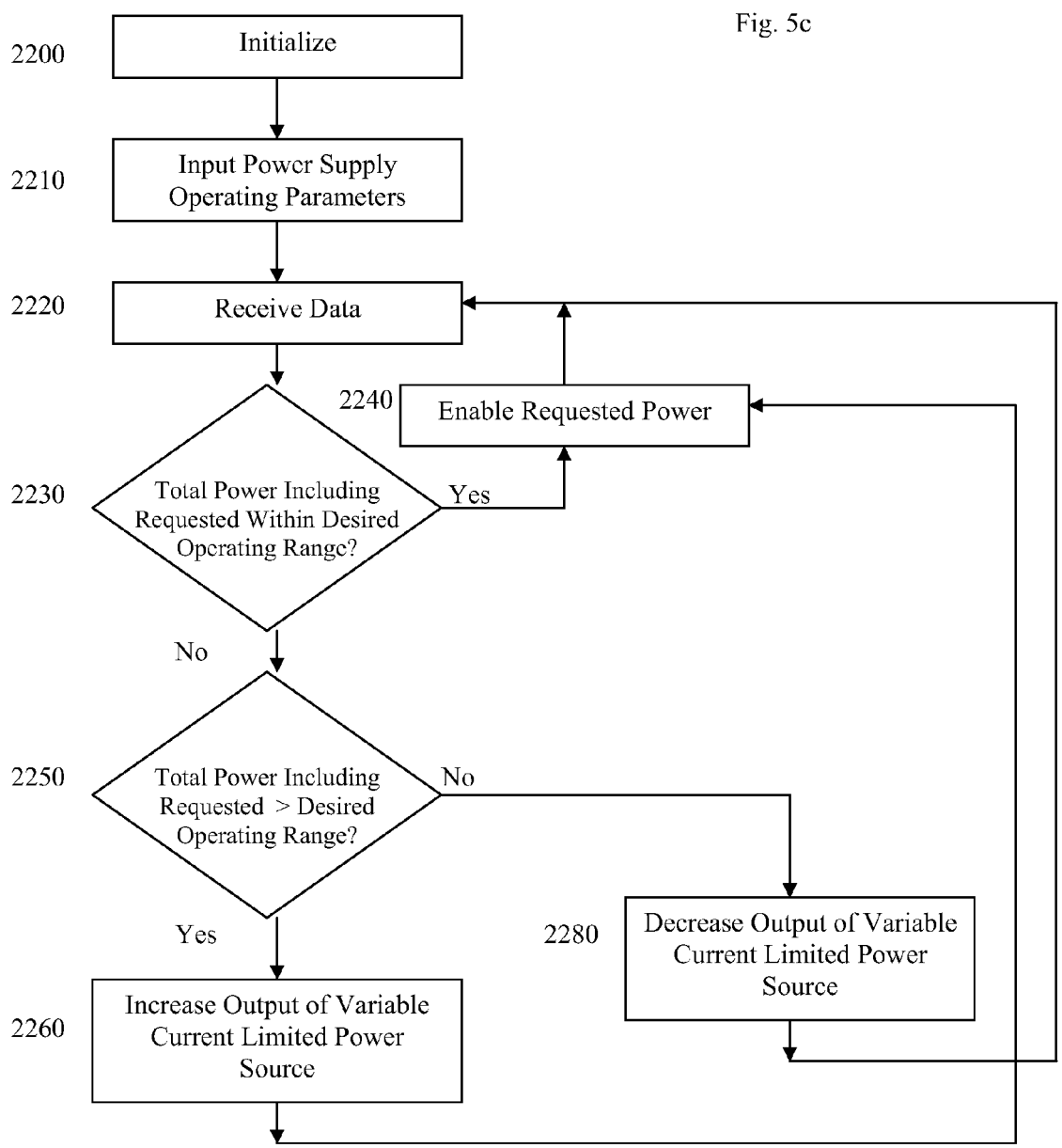
FIG. 5c is a high level flow chart of an embodiment of the operation of the controller of FIG. 2d in accordance with the principle of the invention.

FIG. 5c is a high level flow chart of an embodiment of the operation of controller 450 of FIG. 2d in accordance with the principle of the invention. In step 2200, controller 450 initializes. In step 2210, controller 450 inputs the operating parameters of the associated power supply 240. Preferably, the operating parameters included both a desired operating range and a maximum power output.

In step 2220 controller 450 receives data from local power controller 480 regarding the power drawn by load 460. Controller 450 further receives data from local power controller 480 regarding additional power requested by load 460. In a first preferred embodiment controller 450 requests the data from local power controller 480. In a second preferred embodiment local power controller 480 sends the data on a periodic basis. In a third preferred embodiment local power controller 480 sends data when a substantial change occurs in the power drawn by load 460, or when additional power is requested by load 460.

In step 2230 the power drawn by load 460 and any additional power requested by load 460 as indicated by the data received in step 2220 is compared to the power supply operating parameters input in step 2210. The power output of power supply 240 is equal to, or a function of, the power being drawn by load 460 less any power being supplied by variable current limited power source 220. In the event that the power output of power supply 240 as calculated above plus any additional power request by load 460 is within the desired operating parameters loaded in step 2210, in step 2240 controller 450 enables the additional power requested by load 60 through the operation of local power controller 480, and then step 2220 is performed as described above.

In the event that in step 2230 the power output of power supply 240 as calculated above plus any additional power request by load 460 is not within the desired operating parameters input in step 2210, in step 2250 the power output of power supply 240 plus any additional power requested is compared to see if power supply 240 would exceed the desired operating parameters. If in step 2250 the power output of power supply 240 would exceed the desired operating parameters, in step 2260 controller 450 operates to increase the output of variable current limited power source 220. In a preferred embodiment the output of variable current limited power source 220 is increased in discrete steps. In a non-limiting example, the output of variable current limited power source 220 is increased in 50 watt steps, by modifying the setting of the current limiter of variable current limited power source 220.

In step 2240 controller 450 enables the additional power requested by load 460 through the operation of regulator 480, and then step 2220 is performed as described above.

If in step 2250 the power output of power supply 240 would not exceed the desired operating parameters, thus based on step 2230 the power output of power supply 240 is below the desired operating parameters, in step 2280 controller 450 is operative to reduce the amount of current or power which may be drawn by load 460 under control of local power controller 480.

In step 2280 controller 450 operates to decrease the output of variable current limited power source 220. In a preferred embodiment the output of variable current limited power source 220 is decreased in discrete steps. In a non-limiting example, the output of variable current limited power source 220 is decreased in 50 watt steps, by modifying the setting of the current limiter of variable current limited power source 220. After step 2280 is completed, step 2220 is repeated.

It is to be understood that controller 450 may enable local power controller 480 to supply the full amount of power requested by load 460, part of the amount requested or none of the amount requested, without exceeding the scope of the invention.

Figure 5D:
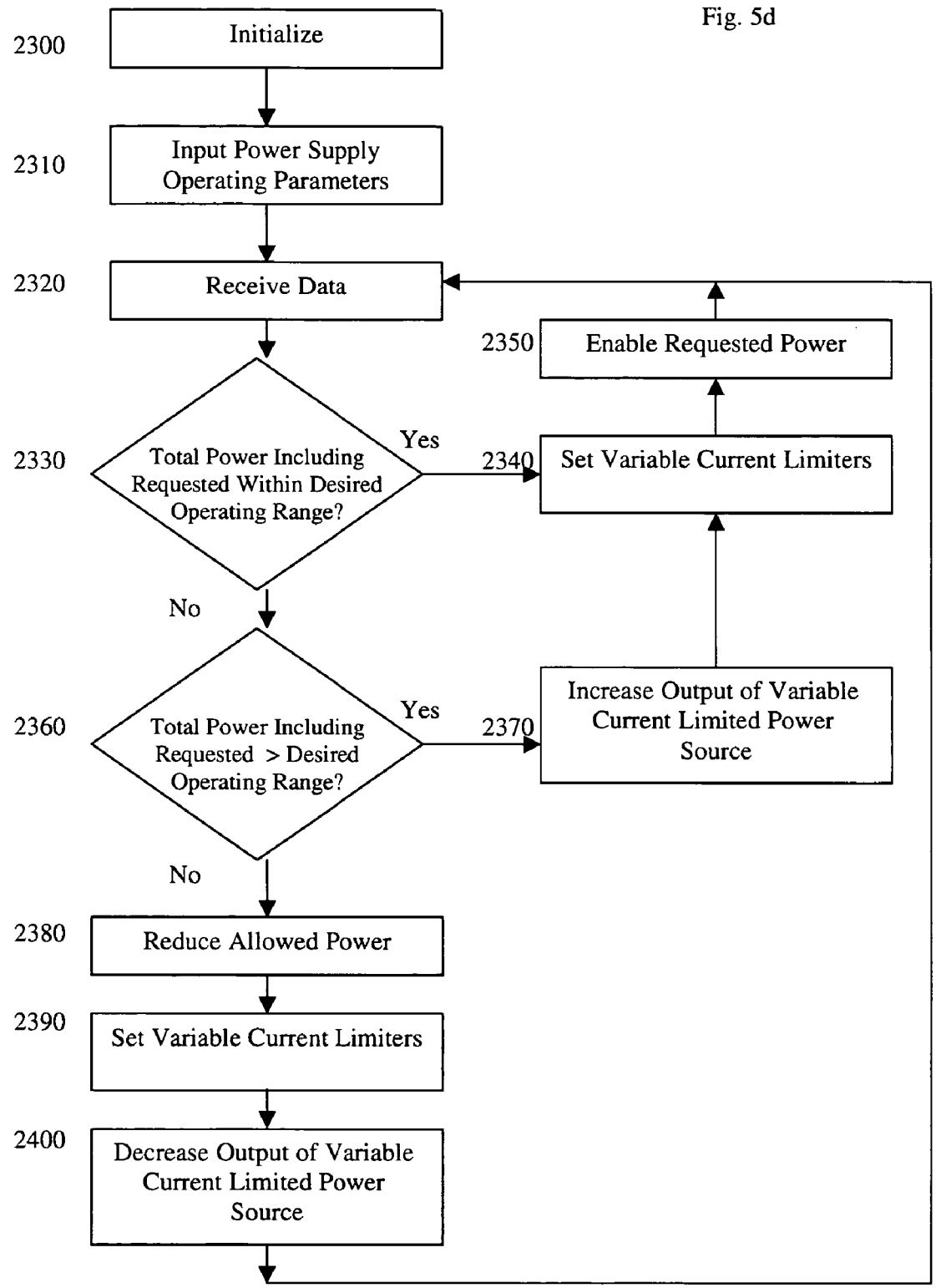
FIG. 5d is a high level flow chart of an embodiment of the operation of the controller of FIG. 2e in accordance with the principle of the invention.

FIG. 5d is a high level flow chart of an embodiment of the operation of controller 550 of FIG. 2e in accordance with the principle of the invention. In step 2300, controller 550 initializes. In step 2310, controller 550 inputs the operating parameters of the associated power supply 240. Preferably, the operating parameters included both a desired operating range and a maximum power output.

In step 2320 controller 550 receives data from local power controller 580 regarding the power drawn by load 460. Controller 550 further receives data from local power controller 580 regarding additional power requested by load 460. Controller 550 further receives data regarding the status of power supply 240, which may include the temperature of power supply 240, the power output, current output or other status information. In a first preferred embodiment controller 550 requests the data from local power controller 580. In a second preferred embodiment local power controller 580 sends the data on a periodic basis. In a third preferred embodiment local power controller 580 sends data when a substantial change occurs in the power drawn by load 460, or when additional power is requested by load 460.

In step 2330 the power drawn by load 460 and any additional power requested by load 460 as indicated by the data received in step 2320 is compared to the power supply operating parameters input in step 2310. The power output of power supply 240 is equal to, or a function of, the power being drawn by load 460 less any power being supplied by variable current limited power source 220. In the event that the power output of power supply 240 as calculated above plus any additional power request by load 460 is within the desired operating parameters loaded in step 2310, and all other operating parameters of power supply 240 are within the acceptable operating range, in step 2340 controller 550 sets variable current limiters 570 and 575 to enable back-up power without risk of overload. In step 2350, controller 550 enables the additional power requested by load 460 through the operation of local power controller 580, and then step 2320 is performed as described above.

In the event that in step 2330 the power output of power supply 240 as calculated above plus any additional power request by load 460 is not within the desired operating parameters loaded in step 2310, or any of the operating parameters of power supply 240 are not within the desired operating parameters, in step 2360 the power output of power supply 240 plus any additional power request is compared to see if power supply 240 would exceed the desired operating parameters. If in step 2360 the power output of power supply 240 would exceed the desired operating parameters, in step 2370 controller 550 operates to increase the output of variable current limited power source 220. In a preferred embodiment the output of variable current limited power source 220 is increased in discrete steps. In a non-limiting example, the output of variable current limited power source 220 is increased in 50 watt steps, by modifying the setting of the current limiter of variable current limited power source 220.

In step 2340 controller 550 sets variable current limiters 570 and 575 to the appropriate limit to enable back-up power without risk of overload. The current limit of current limiter 570 is preferably set to at least the sum of the current limit of variable current limited power source 220 and the expected operating output of power supply 240. The current limit of current limiter 575 is set to not exceed the rated output of power supply 240. In step 2350, controller 550 enables the additional power requested by load 460 through the operation of local power controller 580, and then step 2320 is performed as described above.

If in step 2360 the power output of power supply 240 would not exceed the desired operating parameters, thus based on step 2330 the power output of power supply 240 is below the desired operating parameters, in step 2380 the amount of power allowed by local power controller 580 for load 460 is reduced. In step 2390 controller 450 is operable to set the current limits of variable current limiters 570, 575 so as to enable back-up powering without risk of overload. The current limit of current limiter 570 is preferably set to at least the sum of the current limit of variable current limited power source 220 and the expected operating output of power supply 240. The current limit of current limiter 575 is set to not exceed the rated output of power supply 240.

In step 2400, controller 550 operates to decrease the output of variable current limited power source 220. In a preferred embodiment the output of variable current limited power source 220 is decreased in discrete steps. In a non-limiting example, the output of variable current limited power source 220 is decreased in 50 watt steps, by modifying the setting of the current limiter of variable current limited power source 220. After step 2400 is successfully completed, step 2320 is repeated.

It is to be understood that controller 550 may enable local power controller 580 to supply the full amount of power requested by load 460, part of the amount requested or none of the amount requested, without exceeding the scope of the invention.

Figure 6:
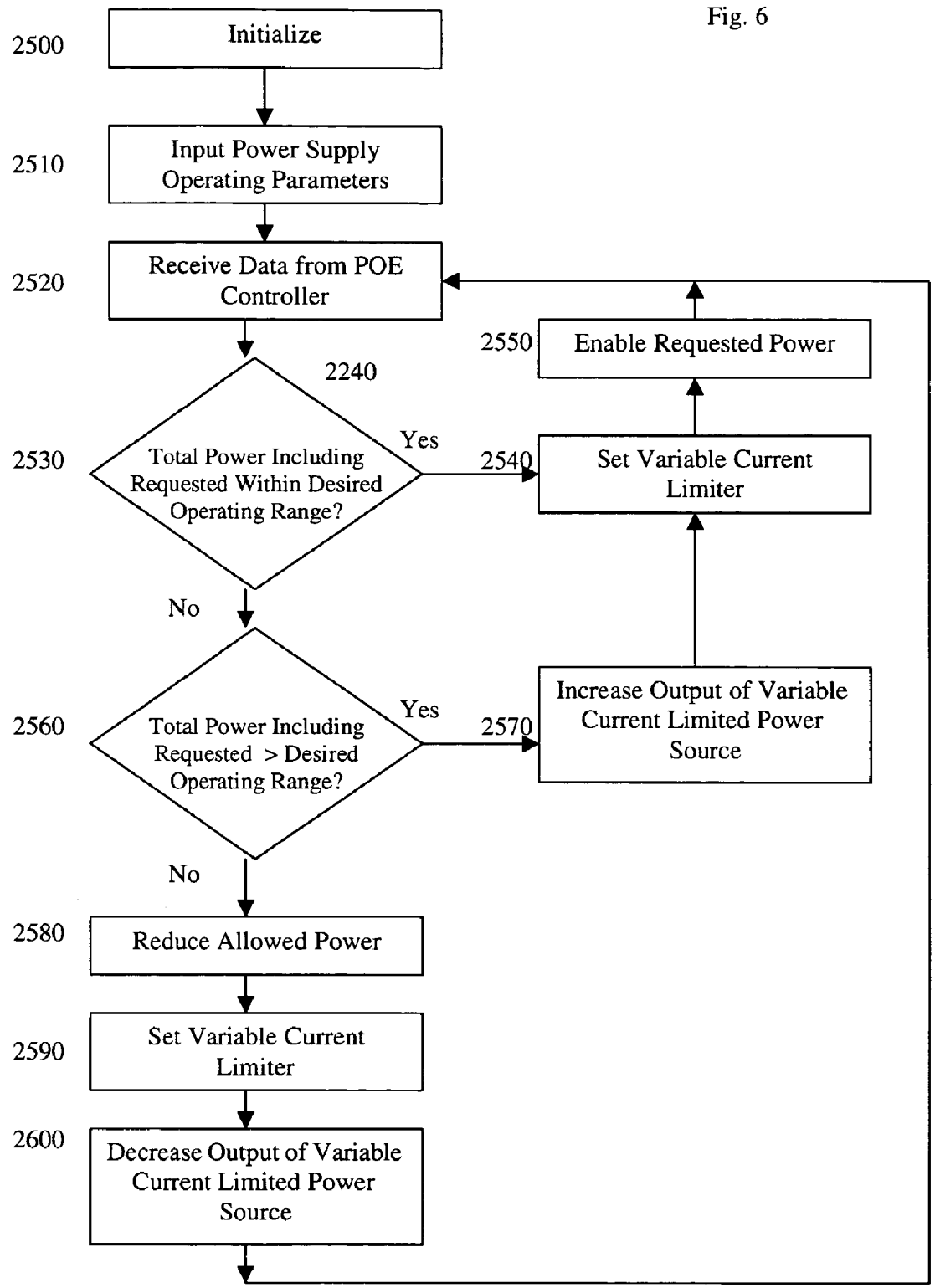
FIG. 6 is a high level flow chart of an embodiment of the operation of the controller of FIG. 3 in accordance with the principle of the invention.

FIG. 6 is a high level flow chart of an embodiment of the operation of controller 650 of FIG. 3 in accordance with the principle of the invention in connection with modules 630a and 630b. In step 2500, controller 650 initializes. In step 2510, controller 650 inputs the operating parameters of the associated power supply 240. Preferably, the operating parameters included both a desired operating range and a maximum power output.

In step 2520 controller 650 receives data from power over Ethernet controller 680. Power drawn by power over Ethernet controller 680 comprises power drawn by powered devices 660 for which power over Ethernet controller 680 is supplying power. Controller 650 further receives data regarding additional power requested by power over Ethernet controller 680. Additional power may be requested by power over Ethernet controller 680 due to the connection of additional powered devices 660. In a first preferred embodiment controller 650 requests the data from power over Ethernet controller 680. In a second preferred embodiment, power over Ethernet controller 680 sends the data on a periodic basis. In a third preferred embodiment, power over Ethernet controller 680 sends data when a substantial change occurs in the power drawn by power over Ethernet controller 680, or additional power is required by power over Ethernet controller 680.

In step 2530 the power drawn by power over Ethernet controller 680 and any additional power requested by power over Ethernet controller 680 as indicated by the data received in step 2520 is compared to the power supply operating parameters input in step 2510. The power output of power supply 240 is equal to, or a function of, the power being drawn by power over Ethernet controller 680 less any power being supplied by variable current limited power source 220 plus the power being drawn by switch 690 of module 630a. In the event that the power output of power supply 240 as calculated above plus any additional power request by power over Ethernet controller 680 is within the desired operating parameters loaded in step 2510, in step 2540 controller 650 sets variable current limiter 570 to enable back-up power without risk of overload. The current limit of current limiter 570 is preferably set to at least the sum of the current limit of variable current limited power source 220 and the expected operating output of power supply 240. In step 2550, controller 650 enables the additional power requested by power over Ethernet controller 680, and then step 2520 is performed as described above.

In the event that in step 2530 the power output of power supply 240 as calculated above plus any additional power requested by power over Ethernet controller 680 is not within the desired operating parameters loaded in step 2510, in step 2560 the power output of power supply 240 plus any additional power request is compared to see if power supply 240 would exceed the desired operating parameters. If in step 2560 the power output of power supply 240 would exceed the desired operating parameters, in step 2570 controller 650 operates to increase the output of variable current limited power source 220. In a preferred embodiment the output of variable current limited power source 220 is increased in discrete steps. In a non-limiting example, the output of variable current limited power source 220 is increased in 50 watt steps, by modifying the setting of the current limiter of variable current limited power source 220.

In step 2540 controller 650 sets variable current limiter 570 to enable back-up power without risk of overload. The current limit of current limiter 570 is preferably set to at least the sum of the current limit of variable current limited power source 220 and the expected operating output of power supply 240. In step 2550, controller 650 enables the additional power requested by power over Ethernet controller 680, and then step 2520 is performed as described above.

If in step 2560 the power output of power supply 240 would not exceed the desired operating parameters, thus based on step 2530 the power output of power supply 240 is below the desired operating parameters, in step 2580 the amount of power allowed by power over Ethernet controller 680 is reduced. In step 2590 controller 650 is operable to set the current limit of variable current limiter 570 so as to enable back-up powering without risk of overload. The current limit of current limiter 570 is preferably set to at least the sum of the current limit of variable current limited power source 220 and the expected operating output of power supply 240.

In step 2600 controller 650 operates to decrease the output of variable current limited power source 220. In a preferred embodiment the output of variable current limited power source 220 is decreased in discrete steps. In a non-limiting example, the output of variable current limited power source 220 is decreased in 50 watt steps, by modifying the setting of the current limiter of variable current limited power source 220. After successful operation of step 2600, step 2520 is repeated.

It is to be understood that controller 650 may enable power over Ethernet controller 680 to supply the full amount of power requested, part of the amount requested or none of the amount requested, without exceeding the scope of the invention.

Controller 650 of FIG. 3 is operable in a mixed mode, in which data associated with switch or router 695 is operated in accordance with the high level flow chart of FIG. 5b, and data associated with power over Ethernet controller 680 is operated in accordance with the high level flow chart of FIG. 6.

Thus the present invention provides for a system of supplying additional power to modules having an associated power supply not designed for load sharing. Typically, the associated power supply is an internal power supply. Power sharing is accomplished by connecting a variable current limited power source in a "wired or"configuration with the associated power supply. The voltage level and current limit of the variable current limited power source is set to supply a share of the total load current, with the balance of the current being supplied by the associated power supply. This is accomplished without having any connection required between the associated power supply and the variable current limited power source.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A system for supplying additional power to a module having an internal power supply, the system comprising:
   a module having an associated power supply, said power supply not being designed to accommodate power sharing;
   at least one load associated with said module, said load receiving power from said power supply;
   a variable current limited power source connected to said module supplying additional power to said at least one load; and
   a controller;
   whereby said variable current limited power source is responsive to an output of said controller to vary the current limit of said variable current limited power source.

2. The system of claim 1, further comprising a source power supply supplying power to said variable current limited power source, said variable current limited power source comprising a boost DC/DC converter.

3. The system of claim 2, wherein said variable current limited power source is operable such that in the event said current limit is exceeded, the voltage output of said variable current limited power source is substantially equal to the voltage output of said source power supply, whereby said variable current limited power source is operable to provide back up power functionality.

4. The system of claim 3, further comprising a current limiter, said current limiter being operable to limit current flow from said source power supply during said provided back up power functionality.

5. The system of claim 2, further comprising a battery back up module connected to supply power to said variable current limited power source in the event of a failure of said source power supply.

6. The system of claim 1, wherein said variable current limited power source comprises a DC/DC converter.

7. The system of claim 1, wherein said variable current limited power source and said associated power supply are connected in a wired or configuration.

8. The system of claim 1, further comprising a monitor in communication with said controller, said monitor being operable to communicate data relating to at least one of power output of said associated power supply and power needs of said at least one load.

9. The system of claim 8, wherein said module further comprises a local power controller, said local power controller comprising said monitor.

10. The system of claim 9, wherein said local power controller is responsive to an output of said controller to enable said power needs of said at least one load.

11. The system of claim 10, wherein said controller is operable in response to said communicated data to enable said power needs of said at least one load through the operation of said local power controller after varying said current limit of said variable current limited power source.

12. The system of claim 1, wherein said module comprises a power over Ethernet controller, said power over Ethernet controller being associated with said at least one load.

13. The system of claim 12, wherein said power over Ethernet controller has at least one powered device attached thereto, said at least one powered device being said at least one load.

14. The system of claim 13, wherein said power over Ethernet controller is responsive to an output of said controller to enable said power needs of said at least one powered device.

15. The system of claim 14, wherein said controller is operable to enable said power needs of said at least one powered device, said power needs being enabled through the operation of said power over Ethernet controller after varying said current limit of said variable current limited power supply.

16. The system of claim 12, wherein said power over Ethernet controller is compatible with the IEE 802.3af standard.

17. The system of claim 1, wherein said module comprises an Ethernet switch.

18. A system for supplying additional power to a load having an associated power supply, the system comprising:
 a load;
 a power supply associated with said load, said power supply supplying power to said load;
 a controller; and
 a variable current limited power source connected to supply power to said load cooperatively with said power supply associated with said load, said variable current limited power source being responsive to an output of said controller to vary the current limit of said variable current limited power source;
 whereby said controller varies said current limit of said variable current limited power source in response to information regarding at least one of said load and said power supply associated with said load.

19. The system of claim 18, further comprising a source power supply supplying power to said variable current limited power source, said variable current limited power source comprising a boost DC/DC converter.

20. The system of claim 19, wherein said variable current limited power source is operable such that in the event said current limit is exceeded, the voltage output of said variable current limited power source is substantially equal to the voltage output of said source power supply, whereby said variable current limited power source is operable to provide back up power functionality.

21. The system of claim 20, further comprising a current limiter, said current limiter being operable to limit current flow from said source power supply during said provided back up power functionality.

22. The system of claim 19, further comprising a battery back up module connected to supply power to said variable current limited power source in the event of a failure of said source power supply.

23. The system of claim 18, wherein said variable current limited power source comprises a DC/DC converter.

24. The system of claim 18, wherein said variable current limited power source and said internal power supply are connected in a wired or configuration.

25. The system of claim 18, further comprising a local power controller, said local power controller supplies said information regarding at least one of said load and said power supply associated with said load to said controller.

26. The system of claim 25, wherein said local power controller is operable by said controller to enable said load.

27. The system of claim 18, further comprising a local power controller responsive to an output of said controller to enable power to said load.

28. The system of claim 27, wherein said controller is operable to enable power to said load through the operation of said local power controller after varying said current limit of said variable current limited power source.

29. The system of claim 18, further comprising a power over Ethernet controller responsive to an output of said controller to enable power to said load.

30. The system of claim 29, wherein said power over Ethernet controller is compatible with the IEEE 802.3af standard.

31. The system of claim 29, wherein said load is a powered device.

32. The system of claim 31, wherein said controller is operable to enable power to said powered device through the operation of said power over Ethernet controller after varying said current limit of said variable current limited power source.

33. The system of claim 31, wherein said powered device is compatible with the IEEE 802.3af standard.

34. A method of supplying additional power to a module having an internal power supply not designed to accommodate power sharing, the method comprising:
 supplying a load, said load having power needs associated thereto;
 supplying a power supply associated with said load;
 supplying a variable current limited power source, said variable current limited power source being connected to supply additional power to said load;
 monitoring at least one of power output of said power supply associated with said load and power needs of said load to obtain monitored data; and varying the current limit of said variable current limited power source in response to said monitored data.

35. The method according to claim 34, further comprising:

supplying a source power supply, said source power supply supplying power to said variable current limited power source; and boosting the voltage supplied by said source power supply by said variable current limited power source.

36. The method of claim 34, further comprising enabling said power needs of said load.

37. The method of 36, wherein said enabling is accomplished after said varying of said current limit.

38. The method of claim 34, wherein said load is a powered device.

39. The method of claim 38, further comprising enabling said power needs of said powered device.

40. The method of claim 39, wherein said enabling said power needs of said powered device is accomplished after said varying of said current limit.

41. A method of supplying additional power to a module having an internal power supply not designed to accommodate power sharing, the method comprising:

supplying a first power to a load; and supplying a variable current limited power to said load, the power needs of said load being in excess of said variable current limit, whereby said variable current limited power is fed to said load and said excess need is fed by said first power.

42. A method of supplying additional power to a module according to claim 41, further comprising:

varying the current limit of said variable current limited power.

43. A system for supplying additional power and back-up power to at least one load, the system comprising:

a first power supply;

a boost converter having a first variable current limiter, said boost converter being connected to an output of said first power supply;

at least one load;

a second power supply associated with said load, said second power supply having a voltage output less than the voltage output of said boost converter; and a second variable current limiter limiting the current flow from said second power supply to said at least one load, wherein the output of said second power supply is connected in a configuration so as to cooperatively supply power with the output of said boost converter to said at least one load, and whereby in the event of a failure of said second power supply, the voltage output of said boost converter is substantially the same as the voltage output of said first power supply, and power to said load is limited by said first variable current limiter.

44. The system of claim 43, further comprising a controller operable to control said second variable current limiter.

45. The system of claim 44, wherein said controller is further operable to control said first variable current limiter.

46. The system of claim 43, wherein the limit of said first variable current limiter is set to be greater than the limit of said second variable current limiter.

47. The system of claim 43, wherein the limit of said first variable current limiter is set to be at least the sum of the power being cooperatively supplied by said second power supply associated with said load and the power supplied by said boost converter.

48. The system of claim 43, further comprising a controller, said controller being operable to enable power to said at least one load.

49. The system of claim 48, wherein said controller is operable to set said first current limiter and said second current limiter to pre-determined limits prior to enabling power to said at least one load.

* * * * *